US 10,754,701 B1

(12) United States Patent
Wagner

(10) Patent No.: US 10,754,701 B1
(45) Date of Patent: Aug. 25, 2020

(54) EXECUTING USER-DEFINED CODE IN RESPONSE TO DETERMINING THAT RESOURCES EXPECTED TO BE UTILIZED COMPLY WITH RESOURCE RESTRICTIONS

(71) Applicant: Amazon Technologies, Inc., Seattle, WA (US)

(72) Inventor: Timothy Allen Wagner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/971,794

(22) Filed: Dec. 16, 2015

(51) Int. Cl.
G06F 9/50 (2006.01)

(52) U.S. Cl.
CPC .......... *G06F 9/5077* (2013.01); *G06F 9/5055* (2013.01)

(58) Field of Classification Search
CPC .............................. G06F 9/5077; G06F 9/5055
See application file for complete search history.

(56) References Cited

U.S. PATENT DOCUMENTS

| 4,949,254 | A | 8/1990 | Shorter |
| 5,283,888 | A | 2/1994 | Dao et al. |
| 5,970,488 | A | 10/1999 | Crowe et al. |
| 6,385,636 | B1 * | 5/2002 | Suzuki ............... G06F 9/505 709/223 |
| 6,463,509 | B1 | 10/2002 | Teoman et al. |
| 6,708,276 | B1 | 3/2004 | Yarsa et al. |
| 7,036,121 | B1 | 4/2006 | Casabona et al. |
| 7,590,806 | B2 | 9/2009 | Harris et al. |

(Continued)

FOREIGN PATENT DOCUMENTS

| EP | 2663052 A1 | 11/2013 |
| JP | 2002287974 A | 10/2002 |

(Continued)

OTHER PUBLICATIONS

Espadas et al. "A tenant-based resource allocation model for scaling Software-as-a-Service applications over cloud computing infrastructures." Future Generation Computer Systems 29.1 (2013): 273-286. Retrieved on [Apr. 21, 2016] Retrieved from the Internet: URLhttp://www.sciencedirect.com/science/articie/pii/S0167739X1100210X.

(Continued)

*Primary Examiner* — Meng Ai T An
*Assistant Examiner* — Michael W Ayers
(74) *Attorney, Agent, or Firm* — Knobbe, Martens, Olson & Bear, LLP

(57) ABSTRACT

Systems and methods are described for determining a location in an on-demand code execution environment to execute user-specified code. The on-demand code execution environment may include many points of presence (POPs), some of which have limited computing resources. An execution profile for a set of user-specified code can be determined that indicates the resources likely to be used during execution of the code. Each POP of the environment may compare that execution profile to resource restrictions of the POP, to determine whether execution of the code should be permitted. In some instances, where execution of the code should not be permitted at a given POP, an alternative POP may be selected to execute the code.

20 Claims, 6 Drawing Sheets

(56) References Cited

U.S. PATENT DOCUMENTS

| | | |
|---|---|---|
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,886,021 B2 | 2/2011 | Scheifler et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 * | 11/2011 | Baryshnikov ......... G06F 9/5027 718/100 |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,209,695 B1 * | 6/2012 | Pruyne .................. G06F 9/5077 709/226 |
| 8,219,987 B1 | 7/2012 | Vlaovic et al. |
| 8,321,554 B2 * | 11/2012 | Dickinson ................. G06F 8/61 709/220 |
| 8,321,558 B1 | 11/2012 | Sirota et al. |
| 8,336,079 B2 | 12/2012 | Budko et al. |
| 8,429,282 B1 | 4/2013 | Ahuja |
| 8,448,165 B1 | 5/2013 | Conover |
| 8,490,088 B2 | 7/2013 | Tang |
| 8,555,281 B1 | 10/2013 | Van Dijk et al. |
| 8,566,835 B2 | 10/2013 | Wang et al. |
| 8,613,070 B1 | 12/2013 | Borzycki et al. |
| 8,631,130 B2 | 1/2014 | Jackson |
| 8,677,359 B1 | 3/2014 | Cavage et al. |
| 8,694,996 B2 * | 4/2014 | Cawlfield ........... G06F 9/45558 718/1 |
| 8,719,415 B1 | 5/2014 | Sirota et al. |
| 8,725,702 B1 | 5/2014 | Raman et al. |
| 8,756,696 B1 | 6/2014 | Miller |
| 8,769,519 B2 | 7/2014 | Leitman et al. |
| 8,799,236 B1 | 8/2014 | Azari et al. |
| 8,799,879 B2 | 8/2014 | Wright et al. |
| 8,806,468 B2 | 8/2014 | Meijer et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,850,432 B2 | 9/2014 | Mcgrath et al. |
| 8,874,952 B2 | 10/2014 | Tameshige et al. |
| 8,904,008 B2 | 12/2014 | Calder et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,052,935 B1 | 6/2015 | Rajaa |
| 9,086,897 B2 | 6/2015 | Oh et al. |
| 9,092,837 B2 | 7/2015 | Bala et al. |
| 9,098,528 B2 | 8/2015 | Wang |
| 9,110,732 B1 | 8/2015 | Forschmiedt et al. |
| 9,111,037 B1 | 8/2015 | Nalis et al. |
| 9,112,813 B2 | 8/2015 | Jackson |
| 9,141,410 B2 | 9/2015 | Leafe et al. |
| 9,146,764 B1 | 9/2015 | Wagner |
| 9,152,406 B2 | 10/2015 | De et al. |
| 9,164,754 B1 | 10/2015 | Pohlack |
| 9,183,019 B2 | 11/2015 | Kruglick |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,413,626 B2 | 8/2016 | Reque et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,483,335 B1 | 11/2016 | Wagner et al. |
| 9,489,227 B2 | 11/2016 | Oh et al. |
| 9,537,788 B2 | 1/2017 | Reque et al. |
| 9,575,798 B2 | 2/2017 | Terayama et al. |
| 9,588,790 B1 | 3/2017 | Wagner et al. |
| 9,600,312 B2 | 3/2017 | Wagner et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,715,402 B2 | 7/2017 | Wagner et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,767,271 B2 | 9/2017 | Ghose |
| 9,785,476 B2 | 10/2017 | Wagner et al. |
| 9,811,363 B1 | 11/2017 | Wagner |
| 9,811,434 B1 | 11/2017 | Wagner |
| 9,830,175 B1 | 11/2017 | Wagner |
| 9,830,193 B1 | 11/2017 | Wagner et al. |
| 9,830,449 B1 | 11/2017 | Wagner |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,952,896 B2 | 4/2018 | Wagner et al. |
| 10,002,026 B1 | 6/2018 | Wagner |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,108,443 B2 | 10/2018 | Wagner et al. |
| 10,140,137 B2 | 11/2018 | Wagner |
| 10,162,672 B2 | 12/2018 | Wagner et al. |
| 10,162,688 B2 | 12/2018 | Wagner |
| 2002/0172273 A1 | 11/2002 | Baker et al. |
| 2003/0071842 A1 | 4/2003 | King et al. |
| 2003/0084434 A1 | 5/2003 | Ren |
| 2003/0229794 A1 | 12/2003 | James, II et al. |
| 2004/0003087 A1 | 1/2004 | Chambliss et al. |
| 2004/0098154 A1 | 5/2004 | Mccarthy |
| 2004/0249947 A1 | 12/2004 | Novaes et al. |
| 2004/0268358 A1 | 12/2004 | Darling et al. |
| 2005/0044301 A1 | 2/2005 | Vasilevsky et al. |
| 2005/0120160 A1 | 6/2005 | Plouffe et al. |
| 2005/0132167 A1 * | 6/2005 | Longobardi .......... G06F 9/5083 712/201 |
| 2005/0132368 A1 | 6/2005 | Sexton et al. |
| 2005/0193113 A1 | 9/2005 | Kokusho et al. |
| 2005/0193283 A1 | 9/2005 | Reinhardt et al. |
| 2005/0257051 A1 | 11/2005 | Richard |
| 2006/0123066 A1 | 6/2006 | Jacobs et al. |
| 2006/0129684 A1 | 6/2006 | Datta |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0242647 A1 * | 10/2006 | Kimbrel ................ G06F 9/5083 718/104 |
| 2006/0248195 A1 | 11/2006 | Toumura et al. |
| 2007/0094396 A1 | 4/2007 | Takano et al. |
| 2007/0130341 A1 | 6/2007 | Ma |
| 2007/0199000 A1 | 8/2007 | Shekhel et al. |
| 2007/0220009 A1 | 9/2007 | Morris et al. |
| 2007/0255604 A1 | 11/2007 | Seelig |
| 2008/0028409 A1 | 1/2008 | Cherkasova et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0126110 A1 | 5/2008 | Haeberle et al. |
| 2008/0126486 A1 | 5/2008 | Heist |
| 2008/0127125 A1 | 5/2008 | Anckaert et al. |

(56) References Cited

U.S. PATENT DOCUMENTS

| | | |
|---|---|---|
| 2008/0147893 A1 | 6/2008 | Marripudi et al. |
| 2008/0189468 A1 | 8/2008 | Schmidt et al. |
| 2008/0201711 A1 | 8/2008 | Husain |
| 2008/0209423 A1 | 8/2008 | Hirai |
| 2009/0013153 A1 | 1/2009 | Hilton |
| 2009/0025009 A1 | 1/2009 | Brunswig et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0193410 A1 | 7/2009 | Arthursson et al. |
| 2009/0198769 A1 | 8/2009 | Keller et al. |
| 2009/0204960 A1 | 8/2009 | Ben-yehuda et al. |
| 2009/0204964 A1 | 8/2009 | Foley et al. |
| 2009/0222922 A1 | 9/2009 | Sidiroglou et al. |
| 2009/0288084 A1 | 11/2009 | Astete et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1* | 10/2010 | Mehta .............. G06Q 10/06 705/348 |
| 2010/0269109 A1 | 10/2010 | Cartales |
| 2010/0325727 A1 | 12/2010 | Neystadt et al. |
| 2011/0010722 A1 | 1/2011 | Matsuyama |
| 2011/0029970 A1 | 2/2011 | Arasaratnam |
| 2011/0055378 A1 | 3/2011 | Ferris et al. |
| 2011/0055396 A1 | 3/2011 | DeHaan |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0179162 A1 | 7/2011 | Mayo et al. |
| 2011/0184993 A1 | 7/2011 | Chawla et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0265164 A1 | 10/2011 | Lucovsky |
| 2011/0271276 A1 | 11/2011 | Ashok et al. |
| 2011/0314465 A1 | 12/2011 | Smith et al. |
| 2011/0321033 A1 | 12/2011 | Kelkar et al. |
| 2012/0011496 A1 | 1/2012 | Shimamura |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072762 A1* | 3/2012 | Atchison ............. G06F 9/5072 714/2 |
| 2012/0072914 A1 | 3/2012 | Ota |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0131379 A1 | 5/2012 | Tameshige et al. |
| 2012/0192184 A1 | 7/2012 | Burckart et al. |
| 2012/0197958 A1 | 8/2012 | Nightingale et al. |
| 2012/0233464 A1 | 9/2012 | Miller et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0067494 A1 | 3/2013 | Srour et al. |
| 2013/0080641 A1 | 3/2013 | Lui et al. |
| 2013/0097601 A1 | 4/2013 | Podvratnik et al. |
| 2013/0111032 A1* | 5/2013 | Alapati .............. G06F 9/5072 709/226 |
| 2013/0111469 A1 | 5/2013 | B et al. |
| 2013/0132942 A1 | 5/2013 | Wang |
| 2013/0139152 A1 | 5/2013 | Chang et al. |
| 2013/0139166 A1 | 5/2013 | Zhang et al. |
| 2013/0151648 A1 | 6/2013 | Luna |
| 2013/0152047 A1 | 6/2013 | Moorthi et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | Mcgrath |
| 2013/0227641 A1 | 8/2013 | White et al. |
| 2013/0227710 A1 | 8/2013 | Barak et al. |
| 2013/0232480 A1 | 9/2013 | Winterfeldt et al. |
| 2013/0239125 A1 | 9/2013 | Iorio |
| 2013/0262556 A1 | 10/2013 | Xu et al. |
| 2013/0263117 A1 | 10/2013 | Konik et al. |
| 2013/0275969 A1 | 10/2013 | Dimitrov |
| 2013/0275975 A1 | 10/2013 | Masuda et al. |
| 2013/0290538 A1 | 10/2013 | Gmach et al. |
| 2013/0297964 A1 | 11/2013 | Hegdal et al. |
| 2013/0339950 A1 | 12/2013 | Ramarathinam et al. |
| 2013/0346946 A1 | 12/2013 | Pinnix |
| 2013/0346964 A1 | 12/2013 | Nobuoka et al. |
| 2013/0346987 A1 | 12/2013 | Raney et al. |
| 2013/0346994 A1* | 12/2013 | Chen ................. G06F 9/5044 718/104 |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068611 A1 | 3/2014 | McGrath et al. |
| 2014/0082165 A1 | 3/2014 | Marr et al. |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |

(56) References Cited

U.S. PATENT DOCUMENTS

| | | |
|---|---|---|
| 2014/0207912 A1 | 7/2014 | Thibeault |
| 2014/0215073 A1 | 7/2014 | Dow et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282615 A1 | 9/2014 | Cavage et al. |
| 2014/0289286 A1 | 9/2014 | Gusak |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0380085 A1 | 12/2014 | Rash et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0052258 A1 | 2/2015 | Johnson et al. |
| 2015/0058914 A1 | 2/2015 | Yadav |
| 2015/0074659 A1 | 3/2015 | Madsen et al. |
| 2015/0081885 A1 | 3/2015 | Thomas et al. |
| 2015/0106805 A1 | 4/2015 | Melander et al. |
| 2015/0120928 A1 | 4/2015 | Gummaraju et al. |
| 2015/0121391 A1* | 4/2015 | Wang .......... G06F 9/4881 718/104 |
| 2015/0135287 A1 | 5/2015 | Medeiros et al. |
| 2015/0142952 A1 | 5/2015 | Bragstad et al. |
| 2015/0143381 A1 | 5/2015 | Chin et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0235144 A1 | 8/2015 | Gusev et al. |
| 2015/0242225 A1 | 8/2015 | Muller et al. |
| 2015/0256621 A1 | 9/2015 | Noda et al. |
| 2015/0261578 A1 | 9/2015 | Greden et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0332048 A1 | 11/2015 | Mooring et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0370560 A1 | 12/2015 | Tan et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0012099 A1 | 1/2016 | Tuatini et al. |
| 2016/0026486 A1 | 1/2016 | Abdallah |
| 2016/0072727 A1 | 3/2016 | Leafe et al. |
| 2016/0092250 A1 | 3/2016 | Wagner et al. |
| 2016/0092252 A1 | 3/2016 | Wagner |
| 2016/0098285 A1 | 4/2016 | Davis et al. |
| 2016/0100036 A1 | 4/2016 | Lo et al. |
| 2016/0117254 A1 | 4/2016 | Susarla et al. |
| 2016/0124665 A1 | 5/2016 | Jain et al. |
| 2016/0140180 A1 | 5/2016 | Park et al. |
| 2016/0191420 A1 | 6/2016 | Nagarajan et al. |
| 2016/0224360 A1 | 8/2016 | Wagner et al. |
| 2016/0224785 A1 | 8/2016 | Wagner et al. |
| 2016/0239318 A1 | 8/2016 | Wagner |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0299790 A1 | 10/2016 | Thompson |
| 2016/0301739 A1 | 10/2016 | Thompson |
| 2016/0350099 A1 | 12/2016 | Suparna et al. |
| 2016/0364265 A1* | 12/2016 | Cao .......... G06F 9/4818 |
| 2016/0371127 A1 | 12/2016 | Antony et al. |
| 2016/0371156 A1 | 12/2016 | Merriman |
| 2016/0378554 A1 | 12/2016 | Gummaraju et al. |
| 2017/0060621 A1 | 3/2017 | Whipple et al. |
| 2017/0083381 A1 | 3/2017 | Cong et al. |
| 2017/0085447 A1 | 3/2017 | Chen et al. |
| 2017/0090961 A1 | 3/2017 | Wagner et al. |
| 2017/0093920 A1 | 3/2017 | Ducatel et al. |
| 2017/0116051 A1 | 4/2017 | Wagner et al. |
| 2017/0177391 A1 | 6/2017 | Wagner et al. |
| 2017/0177413 A1 | 6/2017 | Wisniewski et al. |
| 2017/0192804 A1 | 7/2017 | Wagner |
| 2017/0199766 A1 | 7/2017 | Wagner et al. |
| 2017/0206116 A1 | 7/2017 | Reque et al. |
| 2017/0286143 A1 | 10/2017 | Wagner et al. |
| 2017/0286156 A1 | 10/2017 | Wagner et al. |
| 2017/0371703 A1 | 12/2017 | Wagner et al. |
| 2017/0371706 A1 | 12/2017 | Wagner et al. |
| 2017/0371724 A1 | 12/2017 | Wagner et al. |
| 2018/0004553 A1 | 1/2018 | Wagner et al. |
| 2018/0004572 A1 | 1/2018 | Wagner et al. |
| 2018/0039506 A1 | 2/2018 | Wagner et al. |
| 2018/0121245 A1 | 5/2018 | Wagner et al. |
| 2018/0143865 A1 | 5/2018 | Wagner et al. |
| 2018/0157568 A1 | 6/2018 | Wagner |
| 2018/0203717 A1 | 7/2018 | Wagner et al. |
| 2018/0210760 A1 | 7/2018 | Wisniewski et al. |
| 2018/0309819 A1 | 10/2018 | Thompson |

FOREIGN PATENT DOCUMENTS

| | | |
|---|---|---|
| JP | 2006-107599 A | 4/2006 |
| JP | 2010-026562 A | 2/2010 |
| JP | 2011257847 A | 12/2011 |
| WO | WO 2008/114454 A1 | 9/2008 |
| WO | WO 2009/137567 A1 | 11/2009 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2016/053950 A1 | 4/2016 |
| WO | WO 2016/053973 A1 | 4/2016 |
| WO | WO 20161053968 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |

OTHER PUBLICATIONS

Vaquero, et al. "Dynamically scaling applications in the cloud." ACM SIGCOMM Computer Communication Review 41.1 (2011): pp. 45-52. Retrieved on [Apr. 21, 2016] Retrieved from the Internet: URL<http://dl.acm.org/citation.cfm?id=1925869>.

International Search Report and Written Opinion in PCT/US2015/052810 dated Dec. 17, 2015, 18 pages.

International Search Report and Written Opinion in PCT/US2015/052838 dated Dec. 18, 2015, 23 pages.

International Search Report and Written Opinion in PCT/US2015/052833 dated Jan. 13, 2016, 17 pages.

International Search Report and Written Opinion in PCT/US2015/064071 dated Mar. 16, 2016, 17 pages.

International Search Report and Written Opinion in PCT/US2016/016211 dated Apr. 13, 2016 11 pages.

Adapter Pattern, Wikipedia, https://en.wikipedia.org/w/index.php?title=Adapter_pattern&oldid=654971255, [retrieved May 26, 2016], 6 pages.

Czajkowski, G., and L. Daynes, Multitasking Without Compromise: A Virtual Machine Evolution 47(4a):60-73, ACM SIGPLAN Notices—Supplemental Issue, Apr. 2012.

Dombrowski, M., et al., Dynamic Monitor Allocation in the Java Virtual Machine, JTRES '13, Oct. 9-11, 2013, pp. 30-37.

Nakajima, J., et al., Optimizing Virtual Machines Using Hybrid Virtualization, SAC '11, Mar. 21-25, 2011, TaiChung, Taiwan, pp. 573-578.

Qian, H., and D. Medhi, et al., Estimating Optimal Cost of Allocating Virtualized Resources With Dynamic Demand, ITC 2011, Sep. 2011, pp. 320-321.

Shim (computing), Wikipedia, https://en.wikipedia.org/w/index.php?title+Shim_(computing)&oldid+654971528, [retrieved on May 26, 2016], 2 pages.

(56) References Cited

OTHER PUBLICATIONS

Vaghani, S.B., Virtual Machine File System, ACM SIGOPS Operating Systems Review 44(4):57-70, Dec. 2010.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2016/026514 dated Jun. 8, 2016.
International Search Report and Written Opinion in PCT/US2016/026520 dated Jul. 5, 2016.
International Search Report and Written Opinion in PCT/US2016/054774 dated Dec. 16, 2016.
Anonymous: "Docker run reference", Dec. 7, 2015, XP055350246, Retrieved from the Internet:URL:https://web.archive.org/web/20151207111702/https:/docs.docker.com/engine/reference/run/ [retrieved on Feb. 28, 2017].
Ben-Yehuda et al., "Deconstructing Amazon EC2 Spot Instance Pricing", ACM Transactions on Economics and Computation 1.3, 2013, 15 pages.
Hoffman, Auto scaling your website with Amazon Web Services (AWS)—Part 2, Cardinalpath, Sep. 2015, 15 pages.
International Preliminary Report on Patentability in PCT/US2015/052810 dated Apr. 4, 2017.
International Preliminary Report on Patentability in PCT/US2015/052838 dated Apr. 4, 2017.
International Preliminary Report on Patentability in PCT/US2015/052833 dated Apr. 4, 2017.
International Preliminary Report on Patentability in PCT/US2015/064071 dated Jun. 6, 2017.
International Search Report and Written Opinion in PCT/US2016/066997 dated Mar. 20, 2017.
International Search Report and Written Opinion in PCT/US/2017/023564 dated Jun. 6, 2017.
Amazon, "AWS Lambda: Developer Guide", Retrieved from the Internet, Jun. 26, 2016, URL: http://docs.aws.amazon.com/lambda/latest/dg/lambda-dg.pdf.
Balazinska et al., Moirae: History-Enhanced Monitoring, Published: 2007, 12 pages.
Das et al., Adaptive Stream Processing using Dynamic Batch Sizing, 2014, 13 pages.
International Preliminary Report on Patentability in PCT/US2016/016211 dated Aug. 17, 2017.
International Preliminary Report on Patentability in PCT/US2016/026514 dated Oct. 10, 2017.
International Preliminary Report on Patentability in PCT/US2016/026520 dated Oct. 10, 2017.
International Search Report and Written Opinion in PCT/US2017/040054 dated Sep. 21, 2017.
International Search Report and Written Opinion in PCT/US2017/039514 dated Oct. 10, 2017.
Amazon, "AWS Lambda: Developer Guide", Retrieved from the Internet, 2019, URL : http://docs.aws.amazon.com/lambda/ latest/dg/lambda-dg.pdf, 521 pages.
Bhadani et al., Performance evaluation of web servers using central load balancing policy over virtual machines on cloud, Jan. 2010, 4 pages.
Deis, Container, 2014, 1 page.
Kamga et al., Extended scheduler for efficient frequency scaling in virtualized systems, Jul. 2012, 8 pages.
Kazempour et al., AASH: an asymmetry-aware scheduler for hypervisors, Jul. 2010, 12 pages.
Kraft et al., 10 performance prediction in consolidated virtualized environments, Mar. 2011, 12 pages.
Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.
Meng et al., Efficient resource provisioning in compute clouds via VM multiplexing, Jun. 2010, 10 pages.
Merkel, "Docker: Lightweight Linux Containers for Consistent Development and Deployment", Linux Journal, vol. 2014 Issue 239, Mar. 2014, XP055171140, 16 pages.
Monteil, Coupling profile and historical methods to predict execution time of parallel applications. Parallel and Cloud Computing, 2013, <hal-01228236, pp. 81-89.
Stack Overflow, Creating a database connection pool, 2009, 4 pages.
Tan et al., Provisioning for large scale cloud computing services, Jun. 2012, 2 pages.
Yamasaki et al. "Model-based resource selection for efficient virtual cluster deployment", Virtualization Technology in Distributed Computing, ACM, Nov. 2007, pp. 1-7.
Yue et al., AC 2012-4107: Using Amazon EC2 in Computer and Network Security Lab Exercises: Design, Results, and Analysis, 2012, American Society for Engineering Education 2012.
Extended Search Report in European Application No. 15846932.0 dated May 3, 2018.
Extended Search Report in European Application No. 15847202.7 dated Sep. 9, 2018.
Extended Search Report in European Application No. 15846542.7 dated Aug. 27, 2018.
International Preliminary Report on Patentability in PCT/US2016/054774 dated Apr. 3, 2018.
International Preliminary Report on Patentability in PCT/US2016/066997 dated Jun. 26, 2018.
International Preliminary Report on Patentability in PCT/US/2017/023564 dated Oct. 2, 2018.
International Preliminary Report on Patentability in PCT/US2017/040054 dated Jan. 1, 2019.
International Preliminary Report on Patentability in PCT/US2017/039514 dated Jan. 1, 2019.
U.S. Appl. No. 14/971,859, Execution Locations for Request-Driven Code, filed Dec. 16, 2015.

* cited by examiner

EXECUTING USER-DEFINED CODE IN RESPONSE TO DETERMINING THAT RESOURCES EXPECTED TO BE UTILIZED COMPLY WITH RESOURCE RESTRICTIONS

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
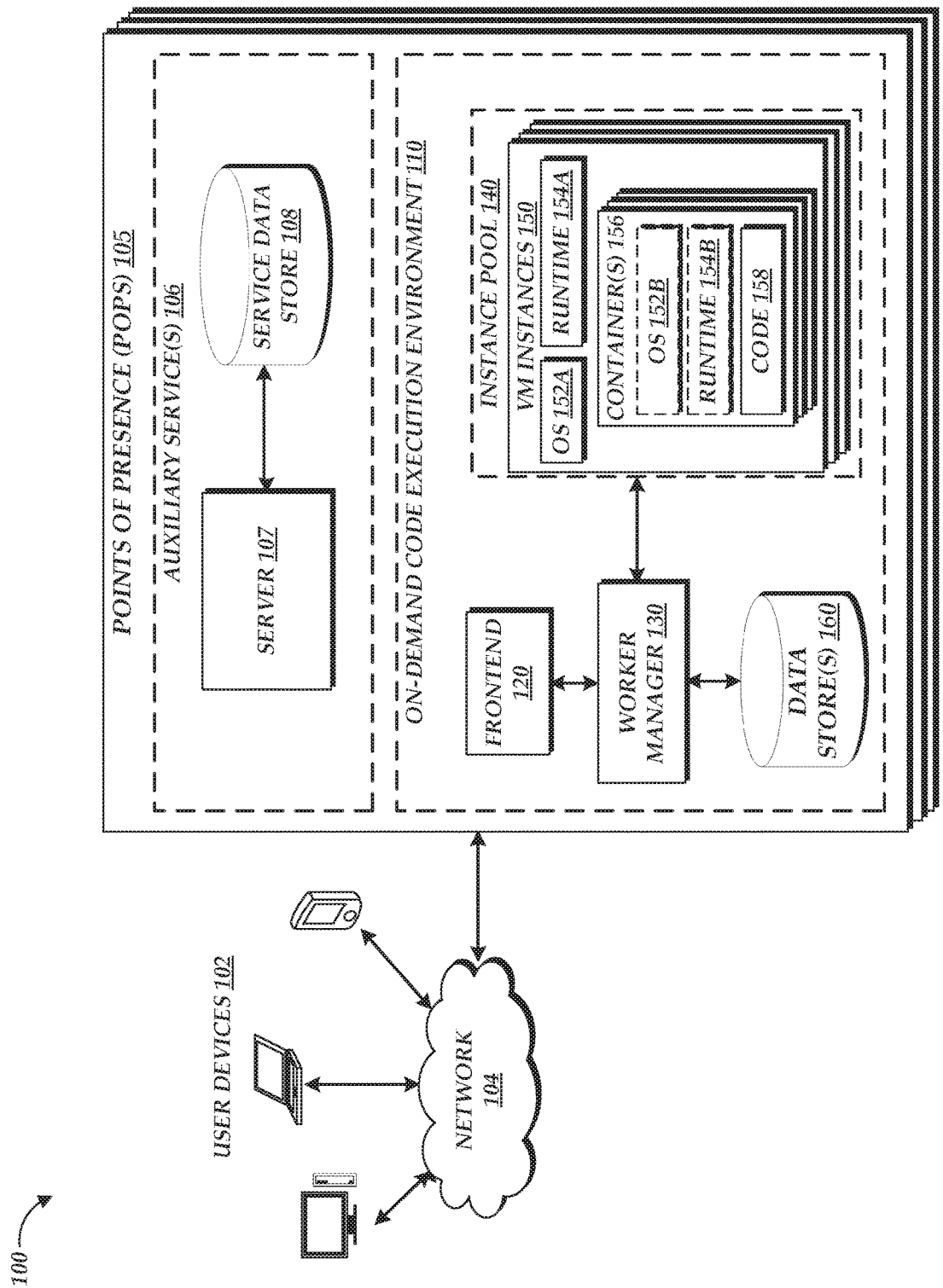
FIG. 1 is a block diagram depicting an illustrative environment including a plurality of points of presence (POPs) implementing instances of an on-demand code execution environment and auxiliary services.

Generally described, aspects of the present disclosure relate to executing user-defined code within a low latency, on-demand code execution environment, as well as managing the computing devices within the code execution environment on which the code is executed. The on-demand code execution environment may operate as part of a system of rapidly provisioned and released computing resources, often referred to as a "cloud computing environment." Specifically, the code execution environment may include one or more computing devices, virtual or non-virtual, that are "pre-warmed" (e.g., booted into an operating system and executing a complete or substantially complete runtime environment) and configured to enable execution of user-defined code, such that the code may be executed rapidly without initializing the virtual machine instance. Each set of code on the on-demand code execution environment may define a "task," and implement specific functionality corresponding to that task when executed on the on-demand code execution environment. Individual implementations of the task on the on-demand code execution environment may be referred to as an "execution" of the task. By defining tasks on the on-demand code execution environment and selectively executing those tasks, users may implement complex functionalities at high speed and low latency, without being required to deploy, configure, or manage the computing devices on which the tasks are executed. The on-demand code execution environment, in turn, may execute tasks of multiple users simultaneously, thus allowing efficient use of computing resources of those devices. To ensure the security and privacy of user information, the on-demand code execution environment may generally ensure that tasks of each user are executed on distinct computing devices (which may be virtual computing devices), thus reducing the chances that a task executing on behalf of a first user could interfere with or gain information regarding execution of a task on behalf of a second user. However, dedicating a computing device to a single user can negatively impact the performance of the on-demand code execution environment, by increasing the required computing resources of that environment and reducing the flexibility of the environment in allocating execution of tasks. Accordingly, aspects of the present disclosure enable the on-demand code execution environment to execute multiple tasks on the same computing device (virtual or non-virtual), while maintaining the security and data privacy of each task execution. Specifically, the present disclosure enables the generation of a risk profile for a task, which indicates a set of computing resources that the task is likely to utilize during execution, and potentially the expected level of use of those resources. By utilizing risk profiles for multiple tasks, the on-demand code execution environment can determine a risk associated with allowing two tasks of unrelated users to execute on the same device. For example, where the risk profiles of the two tasks indicate that each task utilizes different computing resources (e.g., a first task utilizes a persistent storage device, while a second task does not), the risk of executing both tasks on the same computing device can be considered low. Alternatively, where the risk profiles of two tasks indicate that each task requires access to the same computing resource (e.g., both tasks require simultaneous access to the same storage device), the risk of executing both tasks on the same computing device can be considered relatively higher. Thus, by utilizing risk profiles, the on-demand code execution environment can selectively assign execution of tasks of multiple users to the same computing device while maintaining security and privacy of those executions, thus increasing the efficiency and performance of the on-demand code execution system.

In some instances, an on-demand code execution environment may operate as a distributed system, in which multiple points of presence (POPs) implement instances of the on-demand code execution environment. As used herein, a POP is intended to refer to any collection of related computing devices utilized to implement functionality on behalf of one or many providers. POPs are generally associated with a specific geographic location in which the computing devices implementing the POP are located, or with a region serviced by the POP. For example, a datacenter or a collection of computing devices within a datacenter may form a POP. An on-demand code execution environment may utilize multiple POPs that are geographically diverse, to enable users in a variety of geographic locations to quickly transmit and receive information from the on-demand code execution environment. In some instances, the POPs may also implement other services, such as content delivery network (CDN) services, data storage services, data processing services, etc. For the purposes of the present disclosure, these other services will generally be referred to herein as "auxiliary services." Implementation of auxiliary services and instances of the on-demand code execution environment on the same POP may be beneficial, for example, to enable tasks executed on the on-demand code execution environment to quickly interact with the auxiliary services. However, implementation of auxiliary services on a POP may also limit the amount of computing resources available to implement an instance of the on-demand code execution environment. For example, a POP implementing an edge server of a CDN service may have relatively little available computing resources (e.g., in the form of disk space, processor time, memory, etc.) with which to execute tasks. These resources may be even further depleted by attempting to execute those tasks within a distinct computing device, such as a virtual computing device, that does not implement functionalities of the CDN service. Accordingly, aspects of the present disclosure can enable, in some circumstances, the execution of tasks on devices of a POP that also implement an auxiliary service. Specifically, the present disclosure enables a risk profile for the task to be compared with computing resources utilized by the auxiliary service, to determine the risk that execution of the task would interfere with or compromise the security or privacy of the auxiliary service. In instances where such a risk is low, the task can be executed on the same computing device that implements the auxiliary service, thus enabling high efficiency utilization of that computing device, and enabling low latency task execution with respect to data made available by that auxiliary service (e.g., because such execution occurs on the same device implementing the auxiliary service, and no transmission outside the device need occur to execute the task).

Where an on-demand code execution environment utilizes multiple POPs, each implementing an instance of the on-demand code execution environment, it may also be beneficial to share or transfer assignments of task executions between those POPs. For example, where a first POP implements an auxiliary service that limits the computing resources available for on-demand code execution, and where a request is received at that POP to execute a task that would exceed or unduly tax those limited computing resources, it would be beneficial to allow the first POP to reroute the request to a second POP associated with greater available computing resources. Moreover, it would be beneficial to enable such rerouting before execution of the task begins, to reduce inefficiencies or errors related to partial execution of tasks. Accordingly, aspects of the present disclose also enable generation of an execution profile for a task, indicative of the level of computing resources likely to be utilized during execution of a task. Similarly to the risk profile described above, an execution profile may be generated by either or both static analysis of the code corresponding to a task or analysis of historical executions of the task. In some instances, the risk profile and execution profile may be combined into a single profile for the task. In other instances, both profiles may be maintained separately. On receiving a request to execute a task, a POP may compare the execution profile of the task to a set of restrictions for the POP (which may reflect, for example, a permitted level of computing resources to be utilized during execution of a task, or a current level of computing resources available at the POP for execution of a task). If the execution profile of the task satisfies the restrictions for the POP, the POP may execute the first task locally. If the execution profile of the task does not satisfy the restrictions for the POP, the POP may decline to execute the task locally, and may notify a user of the error. In some instances, the POP may also reroute the request to execute the task to an alternative POP (e.g., associated with lower restrictions). Thus, by utilization of an execution profile, each POP associated with an on-demand code execution environment may determine, prior to execution of a task, whether execution of the task should be permitted at that POP, ensuring efficient utilization of resources at each POP.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulates hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The execution of tasks on the on-demand code execution environment will now be discussed. Specifically, to execute tasks, the on-demand code execution environment described herein may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution environment may maintain a pool of virtual machine instances on one or more physical computing devices, where each virtual machine instance has one or more software components (e.g., operating systems, language runtimes, libraries, etc.) loaded thereon. When the on-demand code execution environment receives a request to execute the program code of a user, which specifies one or more computing constraints for executing the program code of the user, the on-demand code execution environment may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution environment may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identify a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in U.S. patent application Ser. No. 14/502,648, entitled "PROGRAMMATIC EVENT DETECTION AND MESSAGE GENERATION FOR REQUESTS TO EXECUTE PROGRAM CODE" and filed Sep. 30, 2014 ("the '648 Application), the entirety of which is hereby incorporated by reference.

The foregoing aspects and many of the attendant advantages of this disclosure will become more readily appreciated as the same become better understood by reference to the following detailed description, when taken in conjunction with the accompanying drawings.

FIG. 1 is a block diagram of an illustrative operating environment 100 in which a plurality of POPs 105 may implement an on-demand code execution environment 110, as well as auxiliary services 106, based on communication with user devices 102. While the user devices 102 and POPs 105 are shown as grouped within FIG. 1, the user devices 102 and POPs 105 may be geographically distant, and independently owned or operated. For example, the user devices 102 could represent a multitude of users in various global, continental, or regional locations accessing the POPs 105. Further, the POPs 105 may be globally, continentally, or regionally disparate, in order to provide a wide geographical presence for the on-demand code execution environment 110 and/or the auxiliary services 106. Accordingly, the groupings of user devices 102 and POPs 105 within FIG. 1 is intended to represent a logical, rather than physical, grouping. The POPs 105 of FIG. 1 are illustratively shown as implementing both auxiliary services 106 and instances of the on-demand code execution environment 110. However, the operating environment 100 may additionally or alternatively include POPs that execute only auxiliary services 106 or only an instance of the on-demand code execution environment 110.

As shown in FIG. 1, to implement an auxiliary service 106, a POP 105 can include a server 107 communicatively coupled to a service data store 108. The server 107 and service data store 108 may operate in conjunction to implement functionalities of the auxiliary service 106. For example, where the auxiliary service 106 is an edge server for a CDN, the server 107 and service data store 108 may operate to cache distributed content (e.g., as provided by a user of the auxiliary service 106), and respond to requests from end users for such cached content. As a further example, where the auxiliary service 106 is a database system, the server 107 and service data store 108 may operate to facilitate and manage interactions with a database. In general, auxiliary services 106 may include any network-based service or data source. Auxiliary services 106 may be associated with operation of the on-demand code execution environment 110, e.g., to provide billing or logging services to the on-demand code execution environment. In some instances, auxiliary services 106 actively transmit information, such as API calls or other task-triggering information, to the on-demand code execution environment 110. In other instances, auxiliary services 106 may be passive, such that data is made available for access by the on-demand code execution environment 110. For example, components of the on-demand code execution environment 110 may periodically poll such passive data sources, and trigger execution of tasks within the on-demand code execution environment 110 based on the data provided. Operation of various auxiliary services 106, including CDN networks, database services, data storage services, and data processing services, are known within the art, and therefore will not be described herein. While a simplified view of auxiliary services 106 is shown in FIG. 1 (e.g., including a single server 107 and service data store 108), the POP 105 may implement an auxiliary service 106 by use of any number of computing or storage devices, which may not be shown in FIG. 1. In some instances, computing or storage devices associated with an auxiliary service 106 may also be utilized to implement functionalities of the on-demand code execution environment 110. For example, virtual machine instances 150 of the on-demand code execution environment 110 (which are described in more detail below) may be implemented by the server 107. In some instances, the on-demand code execution environment 110 may execute tasks directly on the server 107 (e.g., without use of a virtual machine instance 150).

The on-demand code execution environment 110 includes a frontend 120, worker manager 130, instance pool 140, and data stores 160 collectively configured to enable users (via user devices 102) to submit computer executable instructions (also referred to herein as "code" or "user code") to the on-demand code execution environment 110 for execution as a "task." As will be described in more detail below, the frontend 120 can facilitate interactions between the on-demand code execution environment 110 with user devices 102, auxiliary services 106, and/or other computing devices (not shown in FIG. 1) via a network 104. These interactions may include, for example, submission of code, which may be stored within the data stores 160, or transmission of requests to execute code, which may be communicated to the worker manager 130 for assignment to and execution by a virtual machine instance 150 within the instance pool 140. The on-demand code execution environment 110 is depicted in FIG. 1 as operating in a distributed computing environment including several computer systems that are interconnected using one or more computer networks (not shown in FIG. 1). The on-demand code execution environment 110 could also operate within a computing environment having a fewer or greater number of devices than are illustrated in FIG. 1. Thus, the depiction of the on-demand code execution environment 110 in FIG. 1 should be taken as illustrative and not limiting to the present disclosure. For example, the on-demand code execution environment 110 or various constituents thereof could implement various Web services components, hosted or "cloud" computing environments, and/or peer to peer network configurations to implement at least a portion of the processes described herein. Further, the on-demand code execution environment 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more POPs 105.

The network 104 may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Various example user devices 102 are shown in communication with the on-demand code execution environment 110, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution environment 110 may provide the user devices 102 with one or more user interfaces, command-line interfaces (CLI), application programming interfaces (API), and/or other programmatic interfaces for generating and uploading user-executable code, invoking the user-provided code (e.g., submitting a request to execute the user codes on the on-demand code execution environment 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

In FIG. 1, users, by way of user devices 102, may interact with the on-demand code execution environment 110 to provide executable code, and establish rules or logic defining when and how such code should be executed on the on-demand code execution environment 110. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution environment 110, and request that the on-demand code execution environment 110 execute the code using one or more pre-established virtual machine instances. The on-demand code execution environment 110 can handle the acquisition and configuration of compute capacity (e.g., containers, instances, etc., which are described in greater detail below) based on the code execution request, and execute the code using the compute capacity. The on-demand code execution environment 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

To enable interaction with the on-demand code execution environment 110, the environment 110 includes a frontend 120, which enables interaction with the on-demand code execution environment 110. In an illustrative embodiment, the frontend 120 serves as a "front door" to the other services provided by the on-demand code execution environment 110, enabling users (via user devices 102) to provide, request execution of, and view results of computer executable code. The frontend 120 may provide user devices 102 with the ability to upload or otherwise communicate user-specified code to the on-demand code execution environment 110, and to thereafter request execution of that code. To facilitate storage of code, the on-demand code execution environment 110 includes one or more data stores 160, which may correspond to any persistent or substantially persistent data storage, such as a hard drive (HDD), a solid state drive (SDD), network attached storage (NAS), a tape drive, or any combination thereof. In one embodiment, the request interfaces communicates with external computing devices (e.g., user devices 102, auxiliary services 106, etc.) via a graphical user interface (GUI), CLI, or API. The frontend 120 processes the requests and makes sure that the requests are properly authorized. For example, the frontend 120 may determine whether the user associated with the request is authorized to access the user code specified in the request.

The user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code are referred to as "task executions" or simply "executions." Tasks may be written, by way of non-limiting example, in JavaScript (e.g., node.js), Java, Python, and/or Ruby (and/or another programming language). Requests to execute a task may generally be referred to as "calls" to that task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution environment 110) prior to the request being received by the on-demand code execution environment 110. The on-demand code execution environment 110 may vary its execution strategy for a task based on where the code of the task is available at the time a call for the task is processed.

The frontend 120 may receive calls to execute tasks in response to Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the frontend 120.

A call to execute a task may specify one or more third-party libraries (including native libraries) to be used along with the user code corresponding to the task. In one embodiment, the call may provide to the on-demand code execution environment 110 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution environment 110 (e.g., standard routines), and/or provided by third parties. In some embodiments, such resource-level constraints (e.g., how much memory is to be allocated for executing a particular user code) are specified for the particular task, and may not vary over each execution of the task. In such cases, the on-demand code execution environment 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution environment 110 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution environment 110 may inspect the call and look for the flag or the header, and if it is present, the on-demand code execution environment 110 may modify the behavior (e.g., logging facilities) of the container in which the task is executed, and cause the output data to be provided back to the user. In some embodiments, the behavior/mode indicators are added to the call by the user interface provided to the user by the on-demand code execution environment 110. Other features such as source code profiling, remote debugging, etc. may also be enabled or disabled based on the indication provided in a call.

Tasks may executed at the on-demand code execution environment 110 based on explicit calls from user devices 102 (e.g., as received at a request interface of the frontend 120). Alternatively or additionally, tasks may be executed at the on-demand code execution environment 110 based on data retrieved from one or more auxiliary services 106. Illustratively, the frontend 120 may periodically transmit a request to one or more user-specified auxiliary services 106 to retrieve any newly available data (e.g., social network "posts," news articles, etc.), and to determine whether that data corresponds to a user-established trigger to execute a task on the on-demand code execution environment 110. Illustratively, each trigger may specify one or more criteria for execution of a task, including but not limited to whether new data is available at the auxiliary services 106, the type or content of the data, or timing information corresponding to the data. In addition to tasks executed based on explicit user calls and data from auxiliary services 106, the on-demand code execution environment 110 may in some instances operate to execute tasks independently. For example, the on-demand code execution environment 110 may operate (based on instructions from a user) to execute a task at each of a number of specified time intervals (e.g., every 10 minutes).

The frontend 120 can further include an output interface configured to output information regarding the execution of tasks on the on-demand code execution environment 110. Illustratively, the output interface may transmit data regarding task executions (e.g., results of a task, errors related to the task execution, or details of the task execution, such as total time required to complete the execution, total data processed via the execution, etc.) to the user devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

Requests to execute a task may be allocated to the various instances of the on-demand code execution environment 110 executing on the POPs 105 in a variety of manners. In one embodiment, a request may be transmitted directly to a specific POP 105, thereby requesting execution of a task on the instance of the on-demand code execution environment 110 associated with that specific POP 105. In another embodiment, network routing techniques may be utilized to provide load balancing between the POPs 105, or to route requests to a closest POP 105. A variety of such network routing techniques, such as anycast routing and DNS-based load balancing, are known within the art, and therefore will not be discussed in detail herein.

In accordance with embodiments of the present disclosure, the frontend 120 of an instance of the on-demand code execution environment executing on a given POP 105 may analyze any received requests for execution of tasks to determine whether the task may be executed at the POP 105 associated with the frontend 120. For example, each instance of the on-demand code execution environment 110 executed by a POP 105 may be associated with usage restrictions, such as specific types or amounts of computing resources that tasks executing on the POP 105 may utilize. Illustratively, where a POP 105 includes relatively few, low-powered computing devices and/or implements an auxiliary service 106 that utilizes a high amount of computing resources, the resources available to execute tasks on the POP 105 may be limited. In some instances, a POP 105 may simply lack a computing resource required by a task. For example, where a task corresponds to executable code that is intended to run on a discrete graphical processing unit (GPU), the POP 105 may lack such a GPU, and therefore be unable to execute the task. As yet another example, a POP 105 may be capable of providing a task execution with access to a computing resource, but it may be inefficient to do so. For example, where execution of a task requires access to a specific auxiliary service 106 that is provided by a remote POP 105, and where the communication capabilities between the initial POP 105 (on which execution of the task is requested) and the remote POP 105 are limited, the frontend 120 of the initial POP 105 may determine that the task should not be permitted to execute on the initial POP 105 (and may instead be executed on the remote POP 105, or another POP 105 with sufficient communication capabilities to the remote POP 105).

To avoid instances in which a POP 105 is unable to execute a task due to lack of sufficient computing resources, or where use of such computing resources would be inefficient, the frontend 120 can be configured to compare an execution profile of the task to a set of resource restrictions associated with the POP 105. Generally described, execution profiles can indicate a set of computing resources that are likely to be utilized during execution of a task, or an amount of each computing resource likely to be utilized during such executions. The computing resources reflected in an execution profile may include local computing resources, such as processing power (e.g., of a central processing unit [CPU], GPU, etc.), memory (e.g., random access memory [RAM], persistent data storage, etc.], or bandwidth (e.g., network bandwidth, internal bus utilization, etc.). In addition, the computing resources reflected in an execution profile may include external resources, such as specific auxiliary services 106 (e.g., an individual database service).

The frontend 120 may compare an execution profile of a task to a set of resource restrictions associated with the POP 105, to determine whether execution of a task on the POP 105 would comply with those usage restrictions. Generally described, resource restrictions for a POP 105 may indicate levels of computing resources that may be used during execution of a task at the POP 105. In instances where a given computing resource is not available at the POP 105, the resource restrictions may indicate that no use of that computing resource is permitted during execution of a task at the POP 105. Accordingly, when a request to execute a task is received at the frontend 120, the frontend 120 may compare the execution profile of the task to a set of resource restrictions for the POP 105 to determine whether the task should be permitted to execute on the POP 105. In the instance that the task should be permitted to execute, the frontend 120 can distribute execution of the task to the worker manager 130, which in turn interacts with virtual machine instances 150 to cause execution of the task. In the instance that the frontend 120 determines that the execution profile of the task does not comply with the set of resource restrictions, the frontend 120 can decline to service the request, and may notify a user associated with the request that the request has been declined. In some instances, the frontend 120 may also reroute the request to an alternative POP 105, such as a POP 105 with lower resource restrictions. In one embodiment, at least one POP 105 may be associated with no specific resource restrictions, and thus may enable any task permitted by the on-demand code execution environment to be executed at that POP 105. Such a POP 105 may serve as a "default" POP 105, such that any task that fails to satisfy the resource restrictions of a first POP 105 is routed to the default POP 105. Where such a default POP 105 is associated with no resource restrictions, the frontend 120 of that POP 105 may not be required to implement the functionalities described herein with respect to execution profiles.

On verifying that a task satisfies an execution profile of a POP 105, the frontend 120 can distribute the request to execute a task to a worker manager 130, which can assign tasks to virtual machine instances 150 for execution. In the example illustrated in FIG. 1, the worker manager 130 manages the instance pool 140, which is a group (sometimes referred to as a pool) of virtual machine instances 150 that are utilized to execute tasks. As shown in FIG. 1, instances 150 may have operating systems (OS) 152, language runtimes 154, and containers 156. Containers 156 are logical units created within a computing device using the resources available on that device, and may be utilized to isolate execution of a task from other processes (e.g., task executions) occurring on the device. For example, in order to service a request to execute a task, the worker manager 130 may, based on information specified in the request, create a new container 156 within a virtual machine instance 150 within which to execute the task. In other instances, the worker manager 130 may locate an existing container 156 in one of the instances 150 in the instance pool 140 and assign the container 150 to handle the execution of the task. Containers 156 may be implemented, for example, as Linux containers. The containers 156 may have individual copies of the OSes 152, the runtimes 154, and user code 158 corresponding to various tasks assigned to be executed within the container 156.

While the instance pool 140 is shown in FIG. 1 as a single grouping of virtual machine instances 150, some embodiments of the present application may separate virtual machine instances 150 that are actively assigned to execute tasks from those virtual machine instances 150 that are not actively assigned to execute tasks. For example, those virtual machine instances 150 actively assigned to execute tasks may be grouped into an "active pool," while those virtual machine instances 150 not actively assigned to execute tasks may be placed within a "warming pool." Those virtual machine instances 150 within the warming pool may be pre-initialized with an operating system, language runtimes, or other software required to enable rapid execution of tasks in response to user requests. Further details regarding active pools and warming pools are described in greater detail within the '648 application, incorporated by reference above (e.g., at FIG. 1 of the '648 application).

On receiving a request to execute a task, the worker manager 130 may locate a virtual machine instance 150 within the instance pool 140 that has available capacity to execute the task, as described in more detail below. The worker manager 130 may further create a container 156 within the virtual machine instance 150, and provision the container 156 with any software required to execute the task (e.g., an operating system 152, runtime 154, or code). For example, a container 156 is shown in FIG. 1 provisioned with operating system 152B, runtime 154B, and a set of code 158. The operating system 152B and runtime 154B may be the same as the operating system 152A and runtime 154A utilized by the virtual machine instance 150, or may be different. After provisioning the container 156 with the requisite software for a task, the worker manager 130 can cause the virtual machine instance 156 to execute the task on behalf of a user.

In some instances, each virtual machine instance 150 may be utilized only to execute tasks associated with a single user, or group of associated users. Such allocation may provide a high amount of security, by greatly reducing the likelihood that a task execution on behalf of a first user would interfere with or gain unauthorized access to data of a second user. However, such dedicated allocation may increase the amount of computing resources required to execute tasks, as each virtual machine may be associated with "overhead" costs in terms of computing resources. Accordingly, embodiments of the present disclosure can enable the worker manager 130 to utilize a single virtual machine instance 150 to execute tasks on behalf of multiple, unrelated users, while still maintaining the security and data privacy of each user. Each task may be executed within a distinct container 156. However, the security and data privacy provided by use of containers 156 may not be sufficient. Thus, the worker manager 130 may additionally or alternatively utilize risk profiles associated with each task in order to determine when two tasks of different users may be executed by the virtual machine instance 150.

Generally described, risk profiles can reflect the potential ability of a task to interfere with or intercept data from other tasks or processes, thus compromising the security and privacy of those other tasks and processes. In one embodiment, the risk profile can reflect the specific user code corresponding to a task, such as functions or libraries included within the code, as described in more detail below. In another embodiment, the risk profile can reflect the information described above with respect to an execution profile, including the set of computing resources expected to be utilized to execute the task, or the amount of such computing resources. In still more embodiments, a risk profile may reflect a set of permissions available to a task, which indicate actions that the task is allowed to take on the on-demand code execution environment 110.

In some instances, a risk profile may indicate a specific level of risk for a task (e.g., a numerical value within a range), and the worker manager 130 may be configured to assign execution of a task to a virtual machine instance 150 such that a total level of risk for all tasks or processes on the virtual machine instance does not exceed a specific threshold. In other instances, a risk profile may indicate categories of risk for a task, each of which may be associated with a specific characteristic of the task. Categories of risk may include, for example, attributes of the code associated with the task (e.g., programming language used, types of function calls included, libraries loaded), computing resources utilized by the task (e.g., local computing resources, such as disk drives, external computing resources, etc.), or permissions utilized by a task (e.g., as individual permissions or groups of related permissions). For example, permissions related to disk drive access may define a first risk category, while permissions related to a given auxiliary service 106 may define a second risk category, etc. In such instances, the worker manager 130 may be configured to assign execution of a task to a virtual machine instance such that the total risk level for a given risk category of all tasks or process on the virtual machine instance 150 does not exceed a threshold level (which may be the same level for all risk categories, or set on a per category basis). Illustratively, the use of risk categories may enable the worker manager 130 to assign multiple high-risk tasks to the same virtual machine instance 150, so long as those tasks do not pose the same type of risk (and thus are unlikely to interfere with or gain unauthorized access to other tasks or processes). In some embodiments, thresholds for a given risk category may be set to a minimum level, such that any task associated with a non-zero risk level for a given risk category blocks another task with a non-zero risk level in that risk category from being assigned to the same virtual machine instance 150.

Accordingly, when a request to execute a task is received at the on-demand code execution environment 110 and processed by the frontend 120, the worker manager 130 may inspect the risk profile of the task, and compare that risk profile to the risk profiles of other tasks currently assigned to the various virtual machine instances 150. The worker manager 130 can thereafter assign execution of the task to a specific virtual machine instance 150, as described in more detail below. The virtual machine instance 150, in turn, may execute the task to implement desired functionality of the user.

In some embodiments, the on-demand code execution environment 110 is adapted to begin execution of a task shortly after it is received (e.g., by the frontend 120). A time period can be determined as the difference in time between initiating execution of the task (e.g., in a container on a virtual machine instance associated with the user) and receiving a call to execute the task (e.g., received by a frontend). The on-demand code execution environment 110 is adapted to begin execution of a task within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the on-demand code execution environment 110 is adapted to begin execution of a task within a time period that is less than a predetermined duration if one or more conditions are satisfied. For example, the one or more conditions may include any one of: (1) the user code of the task is loaded on a container in the active pool 140 at the time the request is received; (2) the user code of the task is stored in the code cache of an instance in the instance pool 140 at the time the call to the task is received; (3) the instance pool 140 contains an instance assigned to execute a task associated with the user associated with the call at the time the call is received; or (4) the instance pool 140 has capacity to handle the call at the time the call is received.

After the task has been executed, the worker manager 130 may tear down the container 156 used to execute the task to free up the resources it occupied to be used for other containers 156 in the instance 150. Alternatively, the worker manager 130 may keep the container 156 running to use it to service additional calls from the same user. For example, if another call associated with the same task that has already been loaded in the container 156, the call can be assigned to the same container 156, thereby eliminating the delay associated with creating a new container 156 and loading the code of the task in the container 156. In some embodiments, the worker manager 130 may tear down the instance 150 in which the container 156 used to execute the task was created. Alternatively, the worker manager 140 may keep the instance 150 running to use it to service additional calls. The determination of whether to keep the container 156 and/or the instance 150 running after the task is done executing may be based on a threshold time, average call volume, and/or other operating conditions. For example, after a threshold time has passed (e.g., 5 minutes, 30 minutes, 1 hour, 24 hours, 30 days, etc.) without any activity (e.g., task execution), the container 156 and/or the virtual machine instance 150 is shutdown (e.g., deleted, terminated, etc.), and resources allocated thereto are released. In some embodiments, the threshold time passed before a container 156 is torn down is shorter than the threshold time passed before an instance 150 is torn down.

The on-demand code execution environment 110 may in some instances provide data to one or more of the auxiliary services 106 as it services incoming calls. For example, the frontend 120 may communicate with the monitoring/logging/billing services included within the auxiliary services 106. The monitoring/logging/billing services may include: a monitoring service for managing monitoring information received from the on-demand code execution environment 110, such as statuses of containers and instances on the on-demand code execution environment 110; a logging service for managing logging information received from the on-demand code execution environment 110, such as activities performed by containers and instances on the on-demand code execution environment 110; and a billing service for generating billing information associated with executing user code on the on-demand code execution environment 110 (e.g., based on the monitoring information and/or the logging information managed by the monitoring service and the logging service). In addition to the system-level activities that may be performed by the monitoring/logging/billing services (e.g., on behalf of the on-demand code execution environment 110), the monitoring/logging/billing services may provide application-level services on behalf of the tasks executed on the on-demand code execution environment 110. For example, the monitoring/logging/billing services may monitor and/or log various inputs, outputs, or other data and parameters on behalf of the tasks being executed on the on-demand code execution environment 110.

In some embodiments, the worker manager 130 may perform health checks on the instances and containers managed by the worker manager 130 (e.g., those in the instance pool 140). For example, the health checks performed by the worker manager 130 may include determining whether the instances 150 and the containers 156 managed by the worker manager 130 have any issues of (1) misconfigured networking and/or startup configuration, (2) exhausted memory, (3) corrupted file system, (4) incompatible kernel, and/or any other problems that may impair the performance of the instances and the containers. In one embodiment, the worker manager 130 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests.

While the worker manager 130 is described above as assigning execution of a task to a virtual machine instance 150, in some embodiments, tasks may be assigned for execution on non-virtual devices, such as the server 107. Execution of tasks directly on an underlying physical device may reduce the amount of computing resources necessary to execute such tasks, and enable such tasks to execute more quickly. However, execution of tasks directly on an underlying physical device may also increase the risk that such a task will interfere with or gain unauthorized access to data on the underlying physical device (e.g., generated by processes implementing the auxiliary service 106A). In such instances, those processes may also be associated with risk profiles, and the worker manager 130 may be configured to determine that a total risk associated with the server 107 (or with specific risk categories) would not exceed a threshold value, should a task be added to the server. Alternatively or additionally, underlying physical devices may be associated with maximum risk levels, such that a task may not execute on the device if the risk level of the task (or of a specific category) exceeds a threshold amount.

The illustration of the various components within the on-demand code execution environment 110 is logical in nature and one or more of the components can be implemented by a single computing device or multiple computing devices. For example, each of the frontend 120, the worker manager 140, and the virtual machine instances 150 can be implemented in a common physical computing device, or across multiple physical computing devices. Moreover, any one or more of the frontend 120, the worker manager 140, and the virtual machine instances 150 can be implemented on one or more physical computing devices also implementing functionality corresponding to the auxiliary service 106. In some embodiments, the on-demand code execution environment 110 may comprise multiple frontends, multiple warming pool managers, and/or multiple worker managers. One skilled in the art will appreciate that the on-demand code execution environment 110 may comprise any number of virtual machine instances implemented using any number of physical computing devices.

Figure 2:
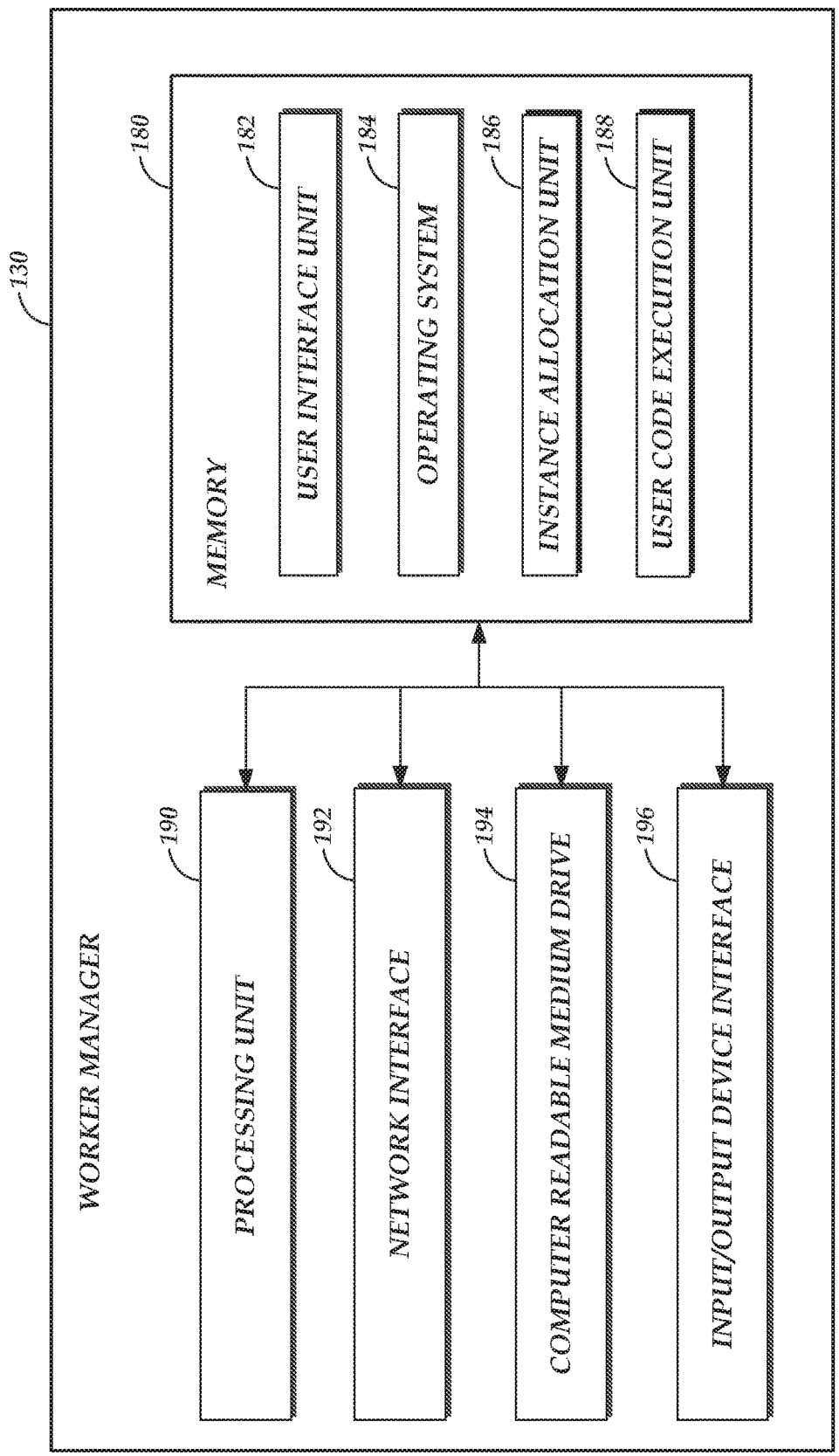
FIG. 2 depicts a general architecture of a computing device implementing a worker manager for implementing low latency code execution on the instances of the on-demand code execution environment of FIG. 1.

FIG. 2 depicts a general architecture of a computing system (referenced as worker manager 130) that manages the virtual machine instances 150 in the on-demand code execution environment 110. The general architecture of the worker manager 130 depicted in FIG. 2 includes an arrangement of computer hardware and software modules that may be used to implement aspects of the present disclosure. The hardware modules may be implemented with physical electronic devices, as discussed in greater detail below. The worker manager 130 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the worker manager 130 includes a processing unit 190, a network interface 192, a computer readable medium drive 194, and an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes RAM, ROM and/or other persistent, auxiliary or non-transitory computer readable media. The memory 180 may store an operating system 184 that provides computer program instructions for use by the processing unit 190 in the general administration and operation of the worker manager 140. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include an instance allocation unit 186 and a user code execution unit 188 that may be executed by the processing unit 190. In one embodiment, the user interface unit 182, instance allocation unit 186, and user code execution unit 188 individually or collectively implement various aspects of the present disclosure, e.g., finding compute capacity (e.g., a container 156 or virtual machine instance 150) to be used for executing user code, causing the user code to be loaded and executed on the container 156, etc. as described further below.

The instance allocation unit 186 finds the compute capacity to be used for servicing a call to execute a task. For example, the instance allocation unit 186 identifies a virtual machine instance 150 and/or a container 156 that satisfies any constraints specified by the call and assigns the identified virtual machine instance 150 and/or container 156 to execute the called task. The instance allocation unit 186 may perform such identification based on the programming language in which the user code corresponding to the task is written. For example, if the user code is written in Python, and the instance allocation unit 186 may find a virtual machine instance 150 having the Python runtime pre-loaded thereon and assign the virtual machine instance 150 to execute task. In another example, if the program code specified in the call of the user is already loaded on an existing container 156 or on another virtual machine instance 150 assigned to the user (e.g., in the instance pool 140 of FIG. 1), the instance allocation unit 186 may cause the called task to be executed in the container 156 or in a new container 156 on the virtual machine instance 150. In some embodiments, if the virtual machine instance has multiple language runtimes loaded thereon, the instance allocation unit 186 may create a new container 156 on the virtual machine instance 150 and load the appropriate language runtime on the container 156 based on the computing constraints specified in the call.

In addition, prior to assigning a virtual machine instance 150 to execute a task, the instance allocation unit 186 can verify that the risk profile of the task enables that task to be assigned to the virtual machine instance 150. In one embodiment, the instance allocation unit 186 can verify that, should the task be assigned to a virtual machine instance 150, a total risk level of tasks assigned to that virtual machine instance 150 would not exceed a threshold amount (which may be established by an administrator of the on-demand code execution environment). Such at total risk level may be determined, for example, by summing the risk levels associated with each task (e.g., as reflected in a risk profile of the task). In another embodiment, the instance allocation unit 186 can verify that, should the task be assigned to a virtual machine instance 150, a total risk level of tasks assigned to that virtual machine instance 150 would not exceed a threshold amount form any specific category of risk.

In the instance that an appropriate virtual machine instance 150 is located to execute the task, the task may be assigned to the virtual machine instance 150 for execution. In the instance that no appropriate virtual machine instance 150 is located, execution of the task may be delayed by the on-demand code execution environment 110, or an error may be generated for reporting to a user associated with the task. In some instances, where no appropriate virtual machine instance 150 is located on a specific POP 105, the instance allocation unit 186 may cause a request to execute the task to be transmitted to an alternative POP 105 hosting an instance of the on-demand code execution environment 110.

After assignment of a task to a virtual machine instance 150, the user code execution unit 188 can manage execution of the program code corresponding to the task. Specifically, the user code execution unit 188 can instruct the virtual machine instance 150 to generate a container 156 in which to execute the code, or to select a pre-existing container (e.g., associated with the same user) in which to execute the code. The user code execution unit 188 can further cause the code to be downloaded into that container on the virtual machine instance 150, and instruct the virtual machine instance 150 to execute that code.

While the instance allocation unit 186 and the user code execution unit 188 are shown in FIG. 2 as part of the worker manager 140, in other embodiments, all or a portion of the instance allocation unit 186 and the user code execution unit 188 may be implemented by other components of the on-demand code execution environment 110 and/or another computing device. For example, in certain embodiments of the present disclosure, another computing device in communication with the on-demand code execution environment 110 may include several modules or components that operate similarly to the modules and components illustrated as part of the worker manager 140.

In some embodiments, the worker manager 130 may further include components other than those illustrated in FIG. 2. For example, the memory 180 may further include a container manager for managing creation, preparation, and configuration of containers 156 within virtual machine instances 150.

While the computing device of FIG. 2 is described as implementing a worker manager 130, the same or a similar computing device may additionally or alternatively be utilized to implement other components of the on-demand code execution environment 110. For example, such a computing device may be utilized, independently or in conjunction with other components (e.g., data stores) to implement the frontend 120 of FIG. 1. The software or computer-executable instructions placed within the memory 180 may be modified to enable execution of the functions described herein with respect to the task profiler 120.

Figure 3A:
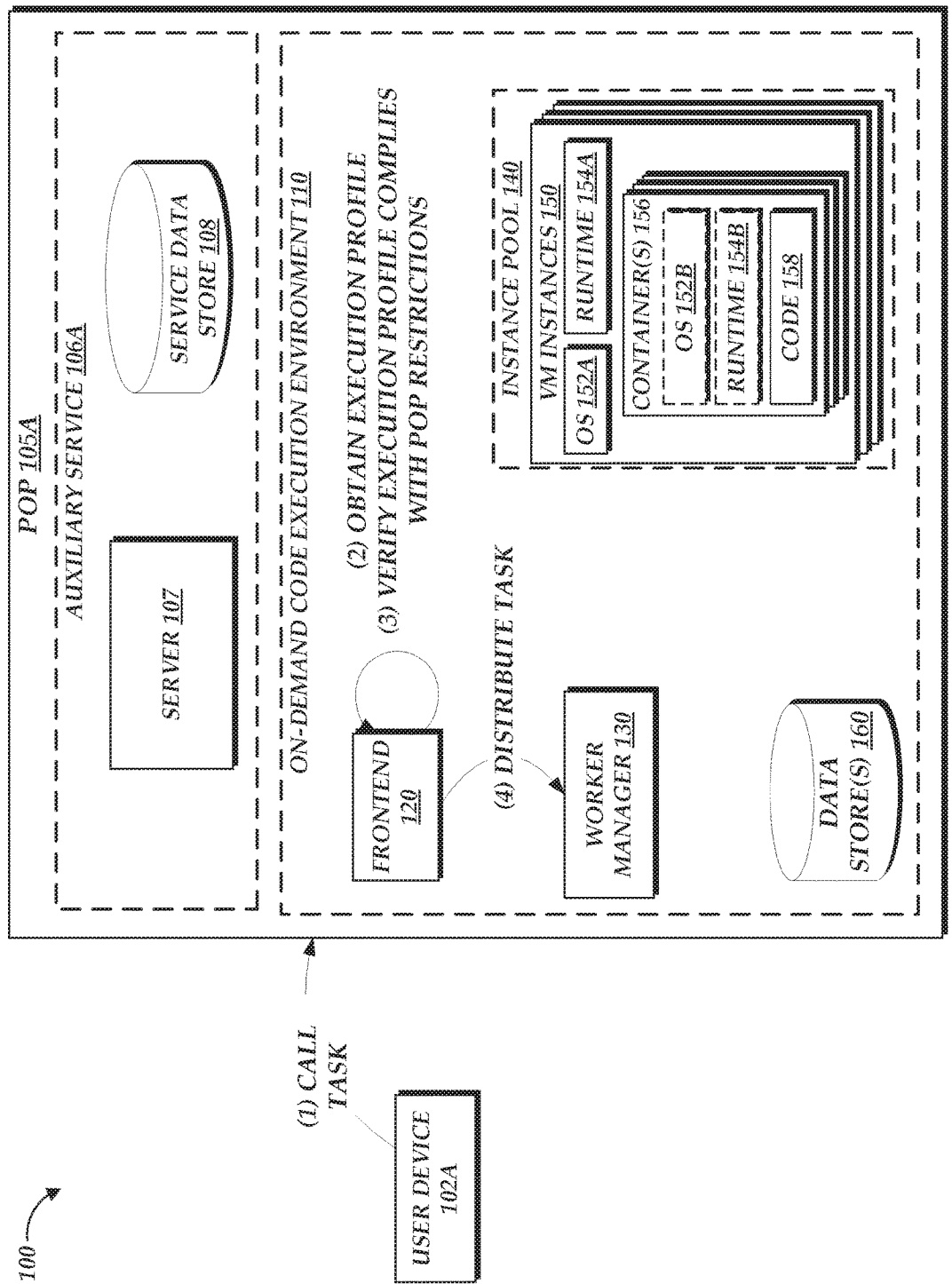
FIG. 3A is a flow diagram depicting illustrative interactions for determining an instance of the on-demand code execution environment of FIG. 1 on which to execute user-specified code.
Figure 3B:
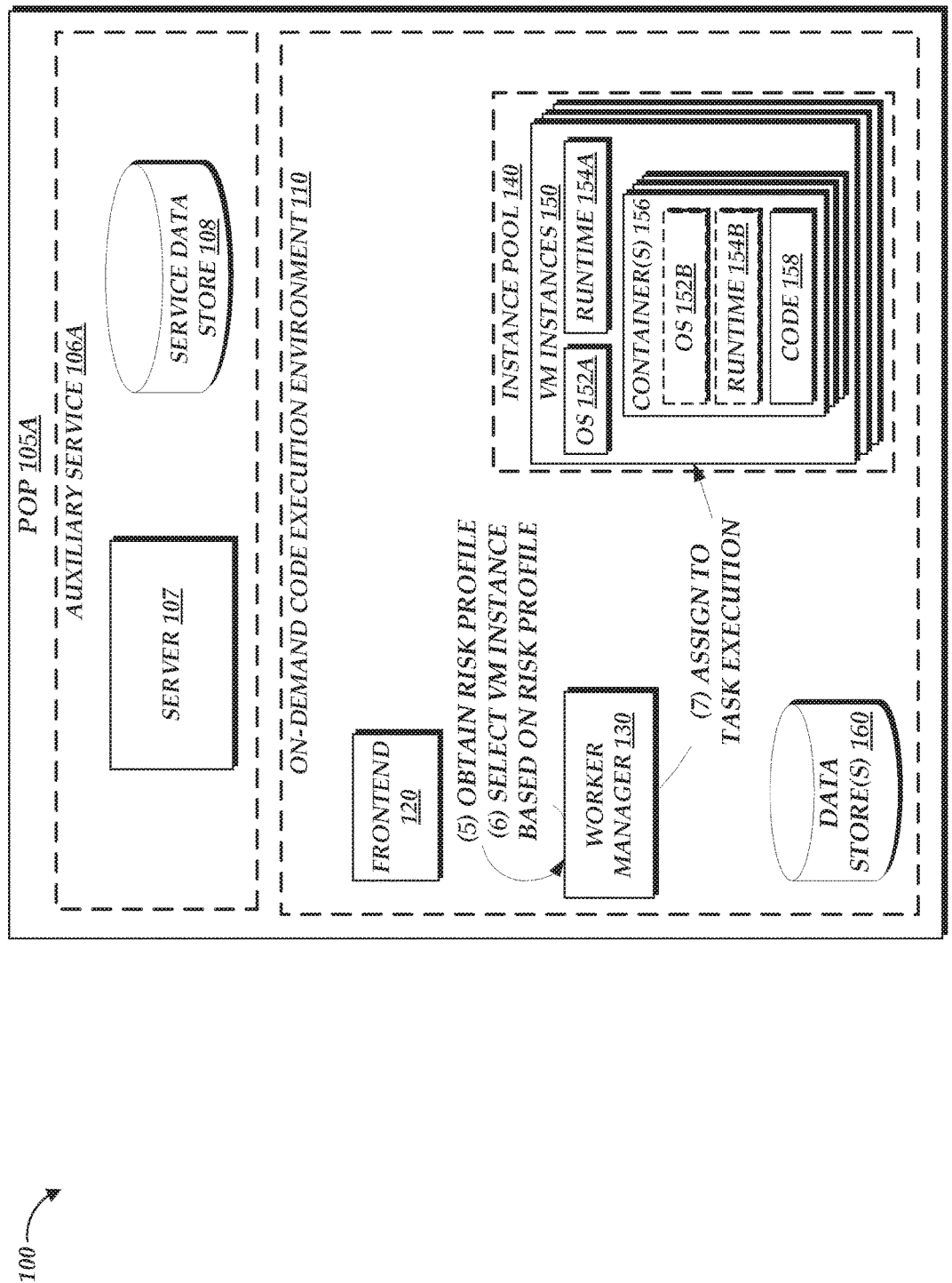
FIG. 3B is a flow diagram depicting illustrative interactions for determining a computing device within an instance of the on-demand code execution environment of FIG. 1 on which to execute user-specified code.
Figure 3C:
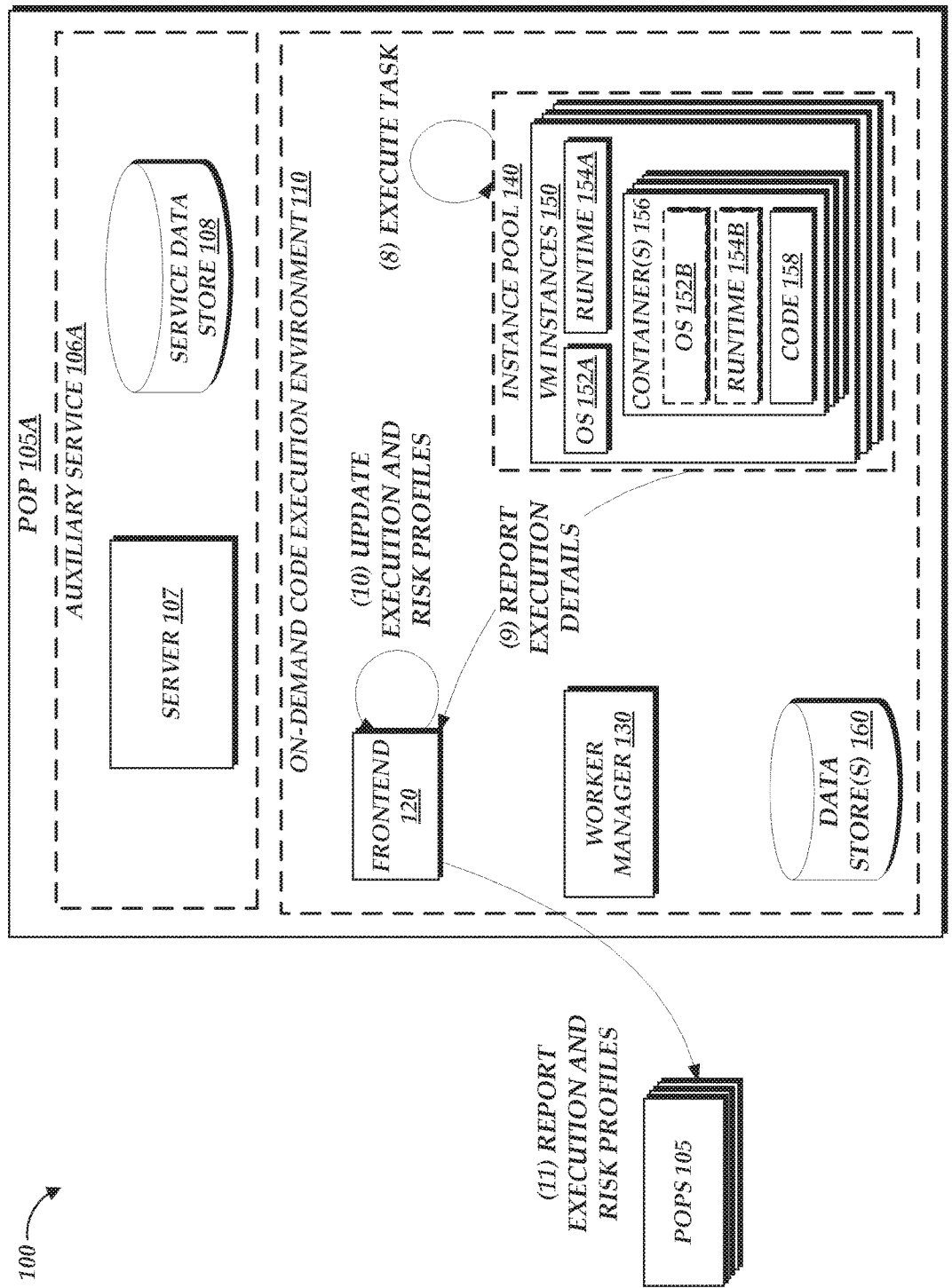
FIG. 3C is a flow diagram depicting illustrative interactions for executing user-specified code within an instance of the on-demand code execution environment of FIG. 1, and generating historical information regarding that execution, which may be utilized to later determine an instance, or a computing device within an instance, on which to execute the user-specified code.

With reference to FIGS. 3A-3C, illustrative interactions are depicted for servicing a request to execute a task on an instance of the on-demand code execution environment 110, shown in FIGS. 3A-3C as executing on POP 105A. Specifically, FIG. 3A depicts illustrative interactions for receiving a call to execute a task, and for verifying that the execution profile of the task satisfies the resource restrictions associated with the POP 105A. FIG. 3B depicts illustrative interactions for allocating the task to a virtual machine instance 150 within the instance pool 140 based on a risk profile of the task. FIG. 3C depicts illustrative interactions for executing a task at a virtual machine instance within the instance pool 140, and for utilizing information gathered during execution of the task to update execution and risk profiles for the task.

The interactions of FIG. 3A begin at (1), where a user device 102A transmits a call to execute a task to the frontend 120 associated with a POP 105A. Illustratively, interaction (1) may include transmission of an API call from the user device 102 to the frontend 120. While shown as transmitted by a user device 102A, task calls may also be transmitted from other sources, such as auxiliary services 106 (implemented on the same or different POP 105). In some instances, a task call may be received at the frontend 120 based on actions by the on-demand code execution environment 110 itself. For example, a task call may be received at the frontend 120 based on execution of a task on the on-demand code execution environment 110 (e.g., at an instance of the environment 110 implemented by the POP 105A or by another POP 105), or based on the on-demand code execution environment 110 detecting the addition of new information (e.g., the posting of a new message to a social networking service, the uploading of a file, etc.) at an auxiliary service 106. In some instances, tasks may be generated automatically by the on-demand code execution environment 110 at intervals specified by a user.

Thereafter, at (2), the frontend 120 obtains an execution profile for the called task. Illustratively, where the call to the task includes code of the task itself, the frontend 120 may conduct an analysis of the task to generate the execution profile. Where the code of a task has been previously provided to the on-demand code execution environment 110, the frontend 120 may retrieve a previously created execution profile for the task (e.g., created when the code was provided to the on-demand code execution environment 110). The previously created execution profile may be stored at the frontend 120 itself, or within the data stores 160.

The execution profile of a task may be generated by the frontend 120 (or other component of the on-demand code execution environment 110) based on static analysis of user code corresponding to the task, dynamic analysis of executions of the task, or both. Generally described, static analysis includes the analysis of a task without requiring execution of the task. For example, on submission of user code corresponding to a task, the frontend 120 may analyze the code to determine any computing resources expected to be utilized during execution of the code. Illustratively, the frontend 120 may identify any functions or calls to specific computing resources (e.g., API calls to specific auxiliary services 106, functions that utilize a specific local computing resources, such as a disk drive, or libraries enabling interaction with specific resources, such as a GPU) included within the code, as well as any libraries or APIs referenced by the code, and determine that execution of the code is likely to utilize those resources. As a further example, the frontend 120 may parse user code corresponding to a task (e.g., utilizing an automated theorem proving algorithm) to determine whether execution of the code would actually utilize resources referenced or implicated by the code, or may inspect permissions requested for a task, to determine what resources those permissions implicate. As yet another example, the frontend 120 may compare code corresponding to the task to other forms of code with known profiles (e.g., an execution or risk profile) to determine a predicted profile for the task. Additionally or alternatively, the execution profile of a task may be generated or revised based on "dynamic analysis," which includes information regarding one or more executions of the task. For example, at each execution of a task, the on-demand code execution environment 110 may record the computing resources utilized during that execution, or the levels of such computing resources used. The on-demand code execution environment 110 (e.g., via the frontend 120) may thereafter compile historical usage information, and provide statistical information regarding the likely computing resources used (or levels of computing resources used) during execution of a task. For example, an execution profile may indicate that, on average, a single execution of a given task utilizes a given amount of RAM, processing power (or cycles), disk read/writes, etc. The execution profile may also indicate additional statistical information, such as a variance in the levels of computing resources used. In some instances, dynamic profiling may further include modifying code corresponding to a task to cause execution of a library that tracks, traces, or otherwise monitors calls to resources made during execution of the code. For example, dynamic profiling may include the addition of a library to the code of a task that periodically reports calls to resource made during execution of the code to the frontend 120 or another component of the on-demand code execution environment 110. Calls to resources made during execution of code corresponding to a task may also be accomplished without requiring modification of code, such as by using operating-system level tracing (e.g., as provided by the Linux seccomp facility). In some instances, both static and dynamic profiling may be utilized to determine the computing resource use of a task execution. Illustratively, an execution profile may be initially created based on static analysis, and continuously updated based on dynamic analysis.

Returning to the interactions of FIG. 3A, at (3), the frontend 120 can verify that the execution profile of the called task complies with a set of resource restrictions associated with the POP 105A. In one embodiment, the set of resource restrictions may be static, such that no task may utilize more than a given amount of each computing resource indicated within the set of resource restrictions. For example, resource restrictions may specify that a task must be expected to execute within a threshold period of time, to utilize less than a threshold amount of memory, etc. In another embodiment, the set of resource restrictions may be dynamic, such that the amount of a given computing resource that may be utilized during execution of a task is based at least in part on current operation of the POP 105A or an instance of the on-demand code execution environment 110 implemented on the POP 105A. For example, resource restrictions may specify that a task utilize no more than 1% of the available RAM of the POP 105A, or that a task must execute within a threshold period of time that varies based on the level of activity of the POP 105A. In yet another embodiment, resource restrictions may include both static and dynamic restrictions (e.g., such that a task must comply with the strictest restriction for any given computing resource within the set of restrictions). Accordingly, the frontend 120, at (3), can compare the computing resources indicated in the execution profile of a task to the resource restrictions associated with the POP 105A to determine whether execution of the task should be permitted at the POP 105. In the instance that the execution profile of a task does not comply with the resource restrictions of the POP 105A (e.g., because execution of the task is expected to utilize computing resources not available at the POP 105A or utilize too high a level of one or more computing resources), the frontend 120 may delay execution of the task at the POP 110 (e.g., to allow resource restrictions to be reduced, where such restrictions are based on activity of the POP 105A), or may generate an error for reporting to a user associated with the task. In some instances, where the execution profile of the task fails to comply with the resource restrictions of the POP 105A, the frontend 120 may cause a request to execute the task to be transmitted to an alternative POP 105 hosting an instance of the on-demand code execution environment 110.

For the purposes of FIG. 3A, it will be assumed that the execution profile of the called task satisfies the resource restrictions of the POP 105A, and thus is permitted to be assigned to a virtual machine instance 150 for execution. Accordingly, at (4), the frontend 120 distributes the task to the worker manager 130, which can facilitate assignment of the task to a virtual machine instance 150.

The interactions described above with respect to FIG. 3A then continue within FIG. 3B, where the worker manager 130 obtains a risk profile for the task. Illustratively, where no prior risk profile of a task is available to the worker manager 130, the worker manager 130 may conduct an analysis of the task to generate the risk profile. Where a risk profile has been previously generated for the task, the worker manager 130 may retrieve a previously created risk profile for the task (e.g., created when the code was provided to the on-demand code execution environment 110). The previously created execution profile may be stored at the worker manager 130 itself, or within the data stores 160.

In one embodiment, the risk profile for a task may be generated by static analysis of the code corresponding to the task, or metadata regarding the task itself. For example, some types of user code, such as those that make direct system calls or implement other high-risk functions, may be associated with higher risk than other types of user code. In some instances, user code written in different programming languages may be associated with different levels of risk. Accordingly, the on-demand code execution environment 110 (e.g., via the worker manager 130) may analyze the code corresponding to a task when that code is provided by a user, and assign a risk level to the code that is incorporated into a risk profile. Illustratively, the on-demand code execution environment 110 may analyze a set of user-submitted code to identify functions calls made or libraries referenced therein, and assign a risk level to the code associated with the highest risk level function call. In some embodiments, a task may be assigned different categories of risk level based on specific attributes of the code. For example, specific functions, libraries, or attributes of a code may be associated with a given risk level within a category of risk. The on-demand code execution environment 110 may utilize additional static profiling techniques, such as those described above, to generate a risk profile for a task. For example, the on-demand code execution environment 110 may parse user code corresponding to a task (e.g., utilizing an automated theorem proving algorithm) to determine whether execution of the code would actually utilize functions or libraries referenced or implicated by the code, or may utilize fingerprinting to assign generate a risk profile for the task based on a known risk profile of a similar set of code.

In another embodiment, a risk profile may include information similar to that included within the execution profile of a task, such as the computing resources likely to be used to execute a task, or the likely level of use of such computing resources. The computing resources reflected in a risk profile may include local computing resources, such as processing power (e.g., of a central processing unit [CPU], graphical processing unit [GPU], etc.), memory (e.g., random access memory [RAM], persistent data storage, etc.], or bandwidth (e.g., network bandwidth, internal bus utilization, etc.). In addition, the computing resources reflected in a risk profile may include external resources, such as specific auxiliary services 106 (e.g., an individual database service). As described in more detail below, the worker manager 130 may compare the risk profile of a task awaiting assignment to a virtual machine 140 to the risk profiles of other processes or tasks currently assigned or being executed by that virtual machine 140, to determine whether assignment of the task awaiting execution is permissible. Illustratively, one or more computing resources may be considered a "blocking resource," such that utilization of that resource by a first task or process on a virtual machine instance 150 blocks the assignment of an additional task that also requires access to that resource. For example, a specific auxiliary service 106, such as a database service, may be considered a blocking resource, such that only a single task assigned for execution on any given virtual machine instance 150 may access that specific auxiliary service 106. As a further example, specific local computing resources, such as disk drives (either individually or in combination), may be considered blocking resources. Because only a single task is enabled to utilize the blocking resource, the risk of a security or privacy breach associated with that specific resource is substantially reduced. In some instances, any utilization of a blocking resource may be sufficient to bar assignment of other tasks requiring access to that resource to a given virtual machine. In other instances, a threshold level of use of a blocking resource (which may be set by an operator of the on-demand code execution environment) may be required to bar assignment of other tasks requiring access to that resource to a given virtual machine.

In still more embodiments, a risk profile of a task may reflect permissions of the task, which reflect the ability of a task, when executed, to take specific actions on the on-demand code execution environment 110. Illustratively, permissions may be associated with a task by a user or entity that has submitted code of the task to the on-demand code execution environment 110. The permissions of a task may include, for example, the ability of the task to access specific auxiliary services 106 or local computing resources, or to execute specific functions or classes of functions. Permissions may generally reflect the functionalities expected of that task (e.g., whether or not the permissions are actually utilized). Permissions may be associated with a specific risk level (either overall or in a given category of risk), such that a task that has permission to undertake a specific action (e.g., access to a specific auxiliary service 106) is associated with a specific risk level. In one embodiment, the risk level of a task (overall or in a given category) may be based at least in part on a sum of the risk levels associated with each permission (overall or in a given category) given to that task. In another embodiment, specific permissions may be implemented as "blocking" permissions, such that a single task provided that permission on a virtual machine instance 150 prevents other task with that permission to be assigned to the virtual machine instance 150.

In addition or alternatively to generation of a risk profile based on static analysis, a risk profile for a task may be determined by "dynamic analysis" (e.g., based at least in part on prior executions of the task). For example, the on-demand code execution environment 110 may be configured to monitor executions of a task to determine the specific computing resources (or amounts of those computing resources) used during past executions, or to determine the permissions actually utilized in executing the task (as opposed to simply those requested by a user that submitted the task). In some embodiments, a risk profile may be created via both static and dynamic analysis. For example, an initial risk profile of a task may be created based on static analysis, and modified after subsequent executions, based on dynamic analysis. For example, an initial risk level assigned to a task via static analysis may be reduced where a particular high risk function reference in the code of the task has never actually been called, despite a large number of prior executions. Similarly, a risk profile may be modified to reflect that while a task has the potential to utilize specific computing resources or permissions, it rarely or never has. Thus, historical information may be utilized by the on-demand code execution environment to further increase the accuracy of a risk profile. In some embodiments, such as where dynamic analysis has not yet occurred, executions of the task may be limited or restricted on the on-demand code execution environment 110. For example, the on-demand code execution environment 110 may "isolate" the executions, such as by permitting the code to be executed only on a virtual machine instance that is not executing any other task.

Returning to the interactions of FIG. 3B, at (6), the worker manager 130 selects a virtual machine instance 150 from the instance pool 140 to assign to execute the task based on the risk profile of the task. In one embodiment, the worker manager 130 may select a virtual machine 150, such that the total risk level associated with the virtual machine 150 would not exceed a threshold level after assignment to execute the task. For example, assume that virtual machines instances 140 are required (e.g., by an administrator of the on-demand code execution environment 110) to maintain a total risk level of lower than 100, and that the called task referenced in FIG. 3B has a risk level of 10. Under such assumptions, the worker manager 130 may assign execution of the task to any virtual machine instance 150 with a current risk level (e.g., as the sum total of all current tasks assigned to, or processes executing on, the virtual machine instance 150) of lower than 90. In another embodiment, the worker manager 130 may select a virtual machine 150, such that a risk level associated with each of a set of risk categories would not exceed a threshold level on an individual virtual machine instance 150 after assignment to execute the task. For example, where the risk profile of the called task indicates a risk only in a specific category, the worker manager 130 may determine that, should the task be assigned to a given virtual machine instance 150, a total risk level within that category for the virtual machine instance 150 would not exceed a threshold value. Threshold values for categories may be set collectively (e.g., such that all categories are associated with the same threshold risk level) or individually (e.g., such that individual categories are associated with different threshold risk levels). Threshold risk levels for one or more categories of risk may be set to a minimum value, such that any task assigned to (or process executing on) a virtual machine instance with a non-zero risk level in that category blocks other tasks associated with a non-zero risk level in that category from being executed.

In some instances, multiple virtual machine instances 150 may be available to be assigned to a task based on the risk profile of the task. The worker manager 130 may be configured to select between such multiple instances 150 according to a default preference set by an operator of the on-demand code execution environment 110. For example, the worker manager 130 may be configured to prefer to heavily group tasks, such that a task is assigned to the available virtual machine instance 150 with the most current tasks, which may allow greater latitude in further assignment of tasks. Alternatively, the worker manager 130 may be configured to prefer to spread out assignment of tasks, such that a task is assigned to the available virtual machine instance 150 with the least current tasks. Still further, the worker manager 130 may be configured to attempt to minimize risk, such that the task is assigned to the available virtual machine instance 150 that results in the lower total risk (or risk in one or more risk categories). While assignment of tasks is described above with respect to risk profiles, the worker manager 130 may additionally consider other factors in assigning a task to a virtual machine instance 150, such as the operating system 152 or runtimes 154 loaded on the virtual machine instance 150. Examples of these additional factors are provided in more detail within the '648 application, incorporated by reference above (e.g., at FIG. 4 of the '648 application).

After selecting a virtual machine instance 150 to which to assign execution of the task, the worker manager 130, at (7), assigns that virtual machine instance 150 to execute the task. Accordingly, the interactions of FIG. 3B enable the on-demand code execution environment 110 to execute multiple tasks of unrelated users on the same virtual machine instance 150, thus reducing the total computing resources needed to execute those multiple tasks. Moreover, because tasks may be grouped onto virtual machine instances 150 by use of a risk profile, the security and data privacy of those tasks can be ensured, despite the lack of a dedicated virtual machine instance on which to execute each task.

With reference to FIG. 3C, the illustrative interactions described above are continued. Specifically, FIG. 3C depicts interactions for executing a task on a virtual machine instance 150, and utilizing the results of that execution to generate or modify either or both a risk profile or execution profile of the task.

The interactions of FIG. 3C begin at (8), where the previously called task is executed on a virtual machine instance within the instance pool 140. Specifically, the virtual machine instance 150 assigned to execute the task can obtain code corresponding to the task (e.g., from the data stores 160), load any software (e.g., runtimes 154) required by that code, and execute the code, in order to implement functionality corresponding to the task.

Thereafter, at (9), the virtual machine instance 150 can report information regarding the task execution to the frontend 120. Illustratively, the information can include data utilized to update or generate a risk or execution profile for the task, including but not limited to functions called by code of the task, computing resources (either local or external) utilized during execution of the task, and levels of that resource usage. At (10), the frontend 120 can utilize the execution details to generate or update an execution profile or risk profile for the task (e.g., as described above with respect to generation of risk or execution profiles based on dynamic analysis of task executions). Thus, the risk and/or execution profile of a task can be continuously or periodically updated utilizing information regarding actual executions of the task on the on-demand code execution environment 110. While interaction (10) is shown in FIG. 3C as implemented on at the frontend 120, in some instances, the interaction may be partially or wholly implemented on another component of the on-demand code execution environment 110, such as the worker manager 130.

In some embodiments, the various POPs 105 implementing instances of the on-demand code execution environment 110 may be configured to share risk and execution profiles among one another. Accordingly, in such instances, after updating a risk or execution profile for a task, the frontend 120 may report the updated risk and/or execution profiles (or the modifications made to the respective profiles) to other POPs 105, at (11). Alterations or updates to risk and/or execution profiles may be synchronized among the POPs 105 according to any of a variety of known synchronization protocols. For example, in some instances the POPs 105 may transmit risk and/or execution profiles of a task via peer-to-peer communication protocols. In other instances, the POPs 105 may transmit risk and/or execution profiles of a task via a central authority, such as a specific POP 105. In other embodiments, each POP 105 may maintain a local risk and/or execution profile for a task, and thus, interaction (11) may be omitted.

While reference is made herein to two distinct profiles—an execution profile and a risk profile-embodiments of the present application may in some instances combine the information of both profiles into a single profile (e.g., a "task profile"). Thus, some embodiments of the present application may utilize execution and risk profiles interchangeably. In other instances, the information of a first profile, such as the execution profile, may be incorporated into and form a subset of a second profile, such as the risk profile.

In addition, while reference is made above with respect to execution of a task on a virtual machine instance 150, some embodiments of the present disclosure may enable the execution of tasks on non-virtual devices, such as the server 107 associated with the auxiliary service 106A (which may also be a host device on which the virtual machine instances 150 are executed). Accordingly, any functionality described herein with respect to a virtual machine instance 150 made herein could also be applied to non-virtual, physical computing devices. In embodiments where such a device also implements other functionalities, such as functionalities of an auxiliary service 106, those functionalities may also be associated with risk profiles, and the total risk level of the device may include a sum of risk levels for all tasks as well as of the other functionalities. Alternatively, the threshold risk levels of a device may be reduced or set to reflect the other functionalities implemented on the device, and the limited risk tolerance for executing tasks on such a device.

Figure 4:
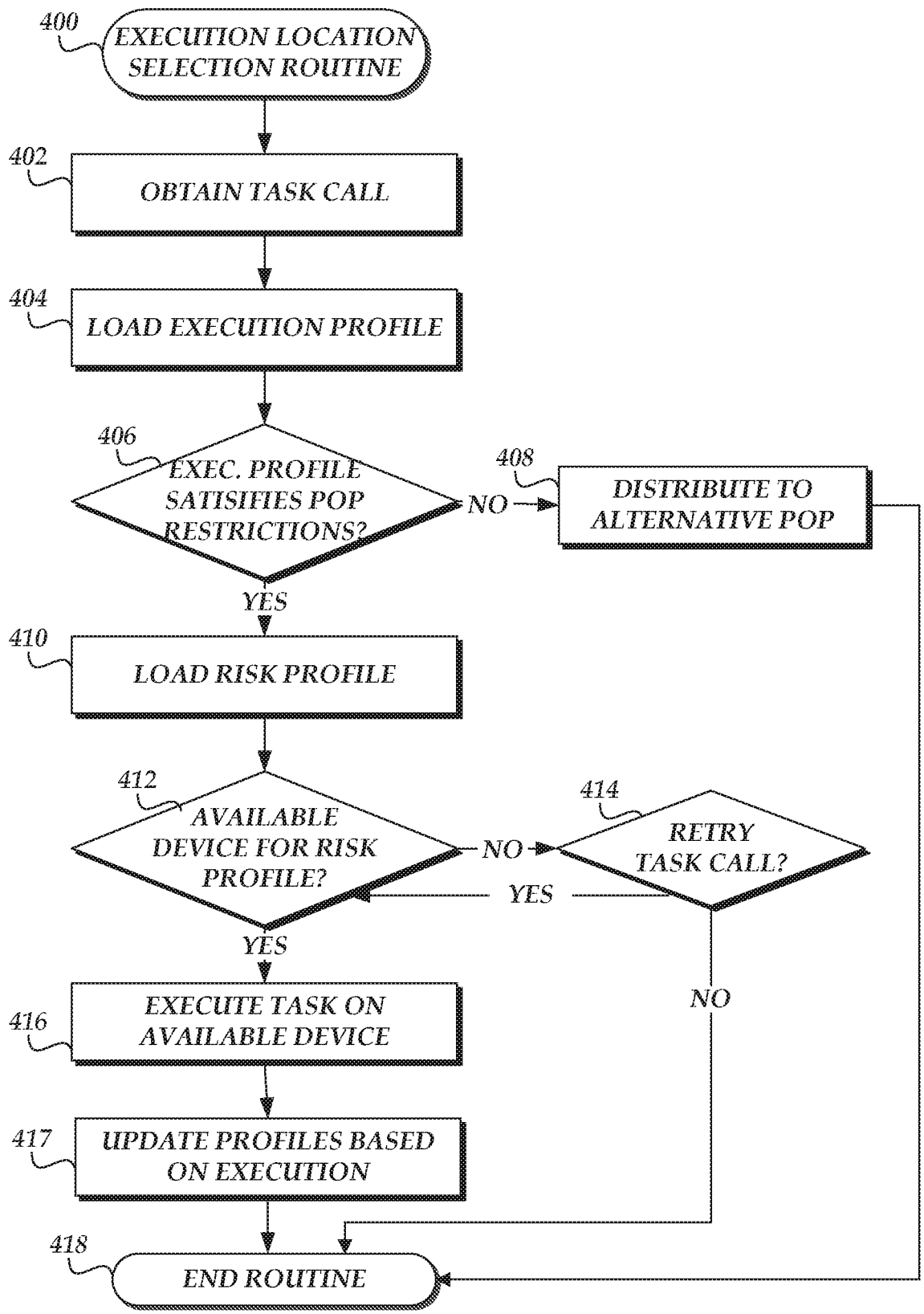
FIG. 4 is a flow chart depicting an illustrative routine for selecting an execution location of user-specified code based on either or both static analysis of the code and analysis of historical executions of the code in the on-demand code execution environment of FIG. 1.

With reference to FIG. 4, a block diagram depicting an illustrative routine 400 for determining an execution location of a task within an on-demand code execution environment 110 will be described. The routine 400 may be implemented, for example, by the frontend 120 of FIG. 1, alone or in conjunction with other components of the on-demand code execution environment 110, such as the worker manager 130.

The routine 400 begins at block 402, where the on-demand code execution environment 110 obtains a task call, requesting execution of a task on the on-demand code execution environment 110. For the purposes of FIG. 4, it will be assumed that the task call is received at an individual POP 105 of a plurality of POPs 105 implementing instances of the on-demand code execution environment 110. As described above, the task call may include an API call or other information transmitted to the POP 105 by a user device 102 or auxiliary service 106, or may be generated at the POP 105 (e.g., based on instructions to periodically call the task, to call the task in response to information obtained from an auxiliary service 106, etc.).

At block 404, the on-demand code execution environment 110 loads an execution profile of the task, which indicates a set of computing resources expected to be utilized during execution of the task, and potentially a level of expected use of those computing resources. As noted above, the execution profile may be generated based on static analysis of the task, or dynamic analysis regarding prior executions of the task on the on-demand code execution environment 110. In instances where no prior execution profile for a task is available to the on-demand code execution environment 110, the on-demand code execution environment 110 (e.g., via the frontend 120) may generate an execution profile for the task during implementation of block 404.

At block 406, the on-demand code execution environment 110 determines whether the execution profile of the task satisfies a set of resource restrictions associated with the POP 105 at which the request was received. The resource restrictions may indicate a set of computing resources available at the POP 105, as well as a permitted usage of those computing resources (e.g., a permitted execution time, permitted RAM usage, etc.). Thus, by comparing an execution profile of the task to the resource restrictions of the POP 105, the on-demand code execution environment 110 may determine, prior to attempting to execute the task, whether execution of the task is permitted at the POP 105.

In the instance that execution of the task is not permitted at the POP 105, the routine 400 continues to block 408, where the request to execute the task is distributed to an alternative POP 105. Illustratively, where the task call initially requested execution of a task at a POP 105 with relatively low computing resources, the task may be distributed to an alternative POP 105 with relatively high computing resources. In some instances, a frontend 120 handling the task call, during implementation of block 408, may be configured to determine an alternative POP 105 on which execution of the task would be permitted, according to the execution profile of the task and the resource restrictions of the alternative POP 105. In other instances, the frontend 120 may be configured to distribute any task not permitted to execute on the current POP 105 to a specified alternative POP 105 (e.g., a "default" POP 105). In still other instances, the frontend 120 may be configured to distribute the task to an alternative POP 105 via a variety of load balancing techniques, such as round robin distribution, random distribution, etc. Load balancing techniques are known in the art and thus will not be described in detail herein. The routine 400 can then end at block 418 (and an additional implementation of the routine 400 may begin at the alternative POP 105).

In the instance that execution of the task is permitted at the POP 105, the routine 400 continues to block 410, where a risk profile of the task is loaded. As described above, the risk profile indicates a risk level associated with executing the task, such as a risk that execution of the task will reduce the security or data privacy of other tasks or processes executing on the on-demand code execution environment 110. In instances where no prior risk profile for a task is available to the on-demand code execution environment 110, the on-demand code execution environment 110 (e.g., via the frontend 120 or a worker manger 130) may generate a risk profile for the task during implementation of block 410.

At block 412, the on-demand code execution environment 110 determines whether a computing device, which may include virtual machine instances 150 or non-virtual computing devices, is available to be assigned to execute the task based on the task's risk profile. As described above, a computing device may be determined to be available to execute a task when the assignment of that task to the device does not cause the total risk level of the device to exceed a threshold value (e.g., as a whole or with respect to specific categories of risk). Accordingly, at block 412, the on-demand code execution environment 110 can determine whether the risk profile of the called task allows that task to be assigned to an available device. While not shown in FIG. 4, implementation of block 412 may additionally include determining that any available device satisfies pre-requisites for execution of the task (e.g., required operating systems, runtimes, etc.), or that the available device can be loaded with such pre-requisites.

If no device is available to be assigned to the task (e.g., because assignment of the task would cause the device to exceed a threshold risk level), the routine 400 continues to block 414, where the on-demand code execution environment 110 determines whether the task should be retried. Illustratively, the on-demand code execution environment 110 may select to retry tasks where the inability to assign the task is based on other tasks being executed by the on-demand code execution environment 110, which may complete in the near future. In such instances, the on-demand code execution environment 110 may attempt to re-try the task at a future time. For example, the on-demand code execution environment 110 may place the task on a queue of tasks awaiting assignment to a device, or may impose a delay before reattempting to assign the task to a device. The on-demand code execution environment 110 may select not to retry tasks where it would not be possible to assign the task to a device (e.g., because the task has a risk level that could never permit it to be assigned to an instance), or where other criteria for abandoning assignment of a task have been met (e.g., a threshold number of prior attempts to assign the task, a threshold time elapsing since the task was called, etc.). In the instance that on-demand code execution environment 110 selects to retry assignment of the task, the routine 400 returns to block 412. In the instance that the on-demand code execution environment 110 selects not to retry the task, the routine 400 ends at block 418. In some instances, where the on-demand code execution environment 110 selects not to retry the task, an error notification may be sent to a user associated with the task.

In the instance that a device is located during implementation of block 412 that is available to be assigned to execute the called task, the routine 400 continues at block 416, where the task is executed by the device. Illustratively, execution of the task may include loading of code corresponding to the task, as well as other data required to execute the task (e.g., runtimes), and executing that code.

At block 417, the on-demand code execution environment 110 can utilize data regarding the execution to modify the execution profile of the task, the risk profile of the task, or both. For example, the on-demand code execution environment 110 may utilize logging data to determine the function calls made during execution of a task, or the computing resources used during execution of the task, and may update the execution and/or risk profiles in accordance with the dynamic analysis mechanisms described above. Thereafter, the routine 400 may end at block 418.

The routine 400 may be altered based on the requirements of the on-demand code execution environment 110. For example, in some embodiments of the present disclosure various functionalities described with respect to the routine 400 may be implemented in parallel, or as separate routines. For example, blocks 404 through 408 may be implemented as a first routine (e.g., executing by a frontend 120 on receiving a call to a task), blocks 412 and 414 may be implemented as a second routine (e.g., executed by a worker manager 130, potentially in parallel with blocks 404 through 408), and blocks 416 and 417 may be implemented as one or more additional routines. Division of the routine 400 into multiple routines may advantageously increase the speed of various functionalities of the routine 400, for example, where the on-demand code execution environment 110 utilizes parallel processing techniques. In some embodiments, one or more portions of the routine 400 may be carried out by other systems or devices, including systems or devices external to the on-demand code execution environment, which provide information to the on-demand code execution environment 110.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method of selecting an execution location in an on-demand code execution environment, the on-demand code execution environment comprising a plurality of points of presence (POPs) on which user-defined code may be executed, the method comprising:
    as implemented by one or more computing devices configured with specific computer-executable instructions,
        generating an execution profile for a task associated with the on-demand code execution environment and generated by a user of the on-demand code execution environment, the task represented by at least a first set of user-defined executable code, wherein the execution profile indicates amounts of individual computing resources, from a set of computing resources, that an execution of the first set of user-defined executable code representing the task on the on-demand code execution environment is expected to utilize;
        obtaining, from a client computing device distinct from a first POP of the plurality of POPs, a request for the first POP to execute the first set of user-defined executable code representing the task on behalf of the client computing device;
        prior to satisfying the request by executing the first set of user-defined executable code representing the task at the first POP on behalf of the client computing device, comparing the execution profile of the task to a set of resource restrictions associated with the first POP, indicating at least a maximum time in which execution of the first set of user-defined executable code representing the task is expected to complete, to determine that the amounts of individual computing resources, from the set of computing resources, expected to be utilized during execution of the first set of user-defined executable code representing the task at the first POP comply with the resource restrictions of the first POP; and
        causing the first POP to execute the first set of user-defined executable code representing the task on behalf of the client computing device in response to determining that the amounts of individual computing resources expected to be utilized complies with the resource restrictions of the first POP.

2. The computer-implemented method of claim 1, wherein causing the first POP to execute the task comprises selecting a virtual machine, from a plurality of virtual machines implemented at the first POP, on which to execute the task.

3. The computer-implemented method of claim 2, wherein the virtual machine is pre-initialized with an operating environment on which to execute the task.

4. The computer-implemented method of claim 1, wherein the execution profile for the task is determined based at least in part on at least one of static analysis of the first set of user-defined executable code or dynamic analysis of executions of the first set of user-defined executable code, wherein static analysis comprises analysis of the first set of user-defined executable code independent of execution of the code, and where dynamic analysis comprises analysis of information regarding the executions of the first set of user-defined executable code.

5. The computer-implemented method of claim 1, wherein the execution profile for the task is determined based at least in part on at least one of function calls included within the first set of user-defined executable code, libraries referenced within the first set of user-defined executable code, or permissions requested for execution of the first set of user-defined code.

6. The computer-implemented method of claim 1, wherein the execution profile for the task is generated based at least in part on static analysis of the first set of user defined executable code, wherein static analysis comprises analysis of content of the first set of user-defined executable code independent of execution of the code.

7. A system for selecting an execution location in an on-demand code execution environment, the on-demand code execution environment comprising a plurality of points of presence (POPs) on which user-defined code may be executed, the system comprising:
    a non-transitory data store including an execution profile for a task associated with the on-demand code execution environment and generated by a user of the on-demand code execution environment, the task represented by at least a set of user-defined executable code, wherein the execution profile indicates individual computing resources, from a set of computing resources, that an execution of the set of user-defined executable code representing the task on the on-demand code execution environment is expected to utilize; and a computing device implementing functionalities of a first POP from the plurality of POPs, the computing device comprising a processor in communication with the non-transitory data store and configured with specific computer-executable instructions to:

obtain, from a client computing device distinct from the first POP, a request for the first POP to execute the set of user-defined executable code representing the task;

prior to satisfying the request by executing the set of user-defined executable code representing the task at the first POP, compare the execution profile of the task to a set of resource restrictions associated with the first POP, indicating at least a maximum time in which execution of the set of user-defined executable code representing the task is expected to complete, to determine that the individual computing resources, from the set of computing resources, expected to be utilized during execution of the set of user-defined executable code representing the task at the first POP comply with the set of resource restrictions of the first POP; and cause the first POP to execute the set of user-defined executable code representing the task in response to determining that the amounts of individual computing resources expected to be utilized complies with the resource restrictions of the first POP.

8. The system of claim 7, wherein the request to execute the set of user-defined executable code representing the task corresponds to at least one of an application programming interface (API) call, a hypertext transport protocol (HTTP) request, a request generated by execution of another task on the on-demand code execution environment, or a request generated by the on-demand code execution environment based on data obtained from an auxiliary service.

9. The system of claim 7, wherein the set of resource restrictions associated with the first POP are determined based at least in part on a set of other tasks assigned for execution at the first POP.

10. The system of claim 7, wherein the computing device is further configured with specific computer-executable instructions to:

obtain a request to execute, at the first POP, a second set of user-defined executable code representing a second task:

compare an execution profile of the second task to the set of resource restrictions associated with the first POP to determine that the individual computing resources, from the set of computing resources, expected to be utilized during execution of the second set of user-defined executable code representing the second task do not comply with the set of resource restrictions; and transmit the request to execute the second set of user-defined executable code representing the second task to a second POP from the plurality of POPs.

11. The system of claim 10, wherein the computing device is further configured with specific computer-executable instructions to select the second POP from the plurality of POPs based at least in part on a set of resource restrictions associated with the second POP.

12. The system of claim 7, wherein the computing resources expected to be utilized during execution of the set of user-defined executable code representing the task include at least one of computing resources local to computing device that implements a virtual machine instance executing the set of user-defined executable code representing the task or computing resources external to the computing device.

13. The system of claim 10, wherein the second POP is associated with lower resource restrictions than the first POP.

14. The system of claim 10, wherein the second POP is not configured to enforce resource restrictions.

15. Non-transitory, computer-readable storage media comprising computer executable instructions for selecting an execution location in an on-demand code execution environment, the on-demand code execution environment comprising a plurality of points of presence (POPs) on which user-defined code may be executed, wherein the computer-executable instructions, when executed by a computer system, cause the computer system to:

obtain, from a client computing device distinct from a first POP of the plurality of POPs, a request for the first POP to execute a set of user-defined executable code representing a task at the first POP;

prior to satisfying the request by executing the set of user-defined executable code representing the task at the first POP, determine that an execution profile for the task complies with a set of resource restrictions on the first POP indicating at least a maximum time in which execution of the set of user-defined executable code representing the task is expected to complete, wherein the execution profile indicates individual computing resources, from a set of computing resources, that an execution of the set of user-defined executable code representing the task on the on-demand code execution environment is expected to utilize, and wherein compliance with the set of resource restrictions indicates that the amounts of individual computing resources, from the set of computing resources, expected to be utilized during execution of the set of user-defined executable code representing the task at the first POP fall within threshold limits established within the resource restrictions on the first POP; and cause the first POP to execute the set of user-defined executable code representing the task in response to determining that the amounts of individual computing resources expected to be utilized complies with the resource restrictions of the first POP.

16. The non-transitory, computer-readable storage media of claim 15, wherein the set of user-defined executable code is executed by a pre-initialized virtual machine instance of the first POP.

17. The non-transitory, computer-readable storage media of claim 15, wherein the set of resource restrictions associated with the first POP are determined based at least in part on a set of other tasks assigned for execution at the first POP.

18. The non-transitory, computer-readable storage media of claim 15, wherein the computer-executable instructions further cause the computer system to:

obtain a request to execute, at the first POP, a second set of user-defined executable code representing a second task;

compare an execution profile of the second task to the set of resource restrictions associated with the first POP to determine that the individual computing resources, from the set of computing resources, expected to be utilized during execution of the second set of user-defined executable code representing the second task do not comply with the set of resource restrictions; and transmit the request to execute the second set of user-defined executable code representing the second task to a second POP from the plurality of POPs.

19. The non-transitory, computer-readable storage media of claim 18, wherein the computer-executable instructions further cause the computer system to select the second POP from the plurality of POPs based at least in part on a set of resource restrictions associated with the second POP.

20. The non-transitory, computer-readable storage media of claim 15, wherein the computing resources expected to be utilized during execution of the set of user-defined executable code representing the task include at least one of computing resources local to a computing device that implements a virtual machine instance executing the set of user defined executable code representing the task or computing resources external to the computing device.

* * * * *